United States Patent
Wigren

(10) Patent No.: US 8,145,137 B2
(45) Date of Patent: *Mar. 27, 2012

(54) METHODS AND ARRANGEMENTS FOR NOISE RISE ESTIMATION

(75) Inventor: Karl Torbjorn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,959

(22) Filed: Jun. 13, 2011

(65) Prior Publication Data
US 2011/0244809 A1 Oct. 6, 2011

Related U.S. Application Data

(63) Continuation of application No. 12/064,854, filed as application No. PCT/SE2005/001242 on Aug. 26, 2005, now Pat. No. 8,005,433.

(51) Int. Cl.
*H04B 17/00* (2006.01)
*H04B 1/00* (2006.01)
*H04B 15/00* (2006.01)

(52) U.S. Cl. .................. 455/67.13; 455/67.11; 455/63.1

(58) Field of Classification Search .............. 455/67.13, 455/67.11, 63.1, 570, 114.2, 278.1, 283, 455/296, 115.1, 226.1, 452.2, 177.1, 200.1, 455/266
See application file for complete search history.

(56) References Cited

U.S. PATENT DOCUMENTS

| | | | |
|---|---|---|---|
| 6,798,843 B1 * | 9/2004 | Wright et al. | 375/296 |
| 8,005,433 B2 * | 8/2011 | Wigren | 455/67.13 |
| 2008/0227400 A1 | 9/2008 | Wigren | |

* cited by examiner

*Primary Examiner* — Eugene Yun
(74) *Attorney, Agent, or Firm* — Roger S. Burleigh

(57) ABSTRACT

A received total wideband power (61A) in a wireless communications system is measured a number of times during a time interval. Preferably, also code powers $((C/I)_i)$ are measured, directly or indirectly. A probability distribution of a first power quantity (63A, 63B), typically total received power is estimated from the set of measurements, preferably using Kalman filtering techniques, and preferably also a probability distribution of a second power quantity (62A, 62B) related to noise and interference signals. A conditional probability distribution of a noise rise measure to be determined is based at least on the probability distribution of the total power (63A, 63B). From that conditional probability distribution, a value of the noise rise measure is calculated. In a preferred embodiment, the noise rise measure is based on a quotient between total power and a noise floor, and the conditional probability distribution of the noise rise is therefore based on a conditional probability distribution of noise floor quantity (64). The conditional probability distribution of the noise floor quantity (64) is in turn based on the probability distribution of the extreme value of a second power quantity (62A, 62B) related to noise and interference signals and a prior determined probability distribution of a noise power floor.

6 Claims, 6 Drawing Sheets

METHODS AND ARRANGEMENTS FOR NOISE RISE ESTIMATION

CROSS-REFERENCE TO RELATED APPLICATIONS

This application is a continuation of U.S. application Ser. No. 12/064,854, filed Feb. 26, 2008, which was the National Stage of International Application No. PCT/SE2005/001242, filed Aug. 26, 2005, the disclosure of which is incorporated herein by reference.

TECHNICAL FIELD

The present invention relates in general to methods and devices for estimation of power-related quantities in cellular communications systems.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. It is well known that existing users of the cell all contribute to the interference level in the uplink of WCDMA systems. Further, terminals in neighbour cells also contribute to the same interference level. This is because all users and common channels of a cell transmit in the same frequency band when CDMA technology is used. The load of the cell is directly related to the interference level of the same cell.

In order to retain stability of a cell, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements. This SIR level is normally such that the received powers in the radio base station (RBS) are several dBs below the interference level. De-spreading in so called RAKE-receivers then enhance each channel to a signal level where the transmitted bits can be further processed, e.g. by channel decoders and speech codecs that are located later in the signal processing chain.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (E-UL) channel in WCDMA, so that one can insure that instability is avoided. In order to do so, the momentary load must be estimated in the RBS. This enables the assessment of the capacity margin that is left to the instability point.

The load of a cell in e.g. a CDMA system is usually referred to some quantity related to power, typically noise rise or the rise over thermal (ROT). Power quantities, such as total power level and noise floor (ideally thermal noise), have to be determined. Determinations of highly fluctuating power quantities or noise floor according to prior art is typically associated with relatively large uncertainties, which even may be in the same order of magnitude as the entire available capacity margin. It will thus be very difficult indeed to implement enhanced uplink channel functionality without improving the load estimation connected thereto.

A number of noise rise measures do exist. The most important one is perhaps the Rise over Thermal (RoT) that is defined as the quotient of the total interference of the cell and the thermal noise power floor of the receiver of the RBS. Other measures include e.g. in-band non-WCDMA interference with respect to the thermal noise floor.

At this point it could be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the pathloss to the digital receiver. Since the pathloss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the pathloss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the load below a specific level. This means that load estimation is important also for coverage. In particular load estimation is important from a coverage point of view in the fast scheduling of enhanced uplink traffic in the RBS. Furthermore, the admission control and congestion control functionality in the radio network controller (RNC) that controls a number of RBSs also benefits from accurate information on the momentary noise rise of the cell.

SUMMARY

A general problem with prior art CDMA communications networks is that load estimations are presented with an accuracy which makes careful load control difficult. In particular, determination of noise rise in connection with enhanced uplink channels, suffers from large uncertainties, primarily caused by difficulties to estimate the noise floor or other power-related quantities.

A general object of the present invention is to provide improved methods and arrangements for determining power-related quantities, e.g. load estimation. A further object of the present invention is to provide methods and arrangements giving more accurate determination of power-related quantities. Yet a further object of the present invention is to provide methods and arrangements for improving noise rise estimations.

The above objects are achieved with methods and devices according to the enclosed patent claims. In general words, a received total wideband power in a wireless communications system is measured a number of times during a time interval. Preferably, also code powers or corresponding radio link powers are measured. A probability distribution of a first power quantity, in a particular embodiment a received total wideband power quantity, is estimated from the set of measurements, preferably using Kalman filtering techniques. Preferably, also a probability distribution of a second power quantity related to interference and noise is estimated. A conditional probability distribution of a noise rise measure to be determined is at least based on the estimated probability distribution of the first power quantity. From the conditional probability distribution of the noise rise measure, a value of the noise rise measure is calculated, and preferably also a standard deviation thereof. In a preferred embodiment, the noise rise measure is based on a quotient between a total power and a noise floor, and the conditional probability distribution of the noise rise measure is therefore based on the probability distribution of the received total wideband power quantity and a conditional probability distribution of a noise floor quantity. The conditional probability distribution of the noise floor quantity is in turn based on the probability distribution of the extreme value of the power quantity related to interference and noise and a prior determined probability distribution of a noise power floor.

It is thus an advantage of the present invention that an accurate noise rise value is provided, even in the presence of neighbour cell interference, external interference sources and rapidly fluctuating powers.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the entire disclosure, bold letters in equations refer to vector or matrix quantities.

The present detailed description is introduced by a somewhat deeper discussion about how to perform load estimation and the problems encountered by prior art solutions, in order to reveal the seriousness thereof. This is done with reference to a typical WCDMA system, but the ideas are not restricted to WCDMA. They are rather applicable in many types of cellular systems.

Reference and Measurement Points

Figure 1:
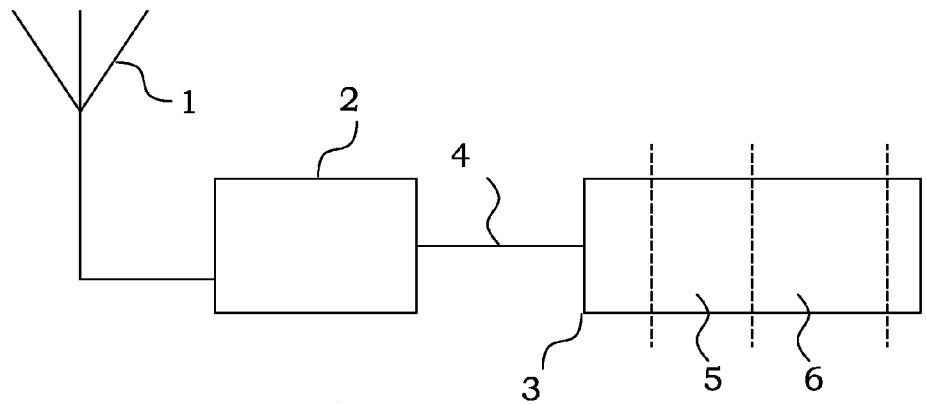
FIG. 1 shows a signal chain of a radio base station performing load estimation.

A typical signal chain of a RBS is depicted in FIG. 1. A received wideband signal from an antenna 1 first passes an analogue signal conditioning chain 2, which consists of cables, filters etc. Variations among components together with temperature drift, render the scale factor of this part of the system to be undetermined with about 2-3 dBs, when the signal enters a receiver 3. This is discussed further below. In the receiver 3, a number of operations take place. For load estimation it is normally assumed that a total received wideband power is measured at some stage, in FIG. 1 denoted by 5. Furthermore, it is assumed in this embodiment that code power measurements, i.e. powers of each individual channel/user of the cell, are made available at a stage 6. A reference point for estimated quantities is referred to as 4. The points in the chain where estimated quantities are valid, and where measurements are taken, are schematically shown in FIG. 1.

There are several reasons for the difficulties to estimate the thermal noise floor power. One reason as indicated above is that the thermal noise floor power, as well as the other received powers, is affected by component uncertainties in the analogue receiver front end. The signal reference points are, by definition, at the antenna connector. The measurements are however obtained after the analogue signal conditioning chain, in the digital receiver. These uncertainties also possess a thermal drift.

The analogue signal conditioning electronics chain does introduce a scale factor error of 2-3 dB between RBSs (batch) that is difficult to compensate for. The RTWP (Received Total Wideband Power) measurement that is divided by the default value of the thermal noise power floor may therefore be inconsistent with the assumed thermal noise power floor by 2-3 dB. The effect would be a noise rise estimate that is also wrong by 2-3 dB. Considering the fact that the allowed noise rise interval in a WCDMA system is typically 0-7 dB, an error of 2-3 dB is not acceptable.

Fortunately, all powers forming the total received power (c.f. Appendix A) are equally affected by the scale factor error $\gamma(t)$ so when the noise rise ratio $N_R(t)$ (c.f. Appendix A) is calculated, the scale factor error is cancelled as $$N_R(t) = N_R^{DigitalReceiver}(t) \qquad (1)$$
$$= \frac{P^{Total,DigitalReceiver}(t)}{P_N^{DigitalReceiver}}$$
$$= \frac{\gamma(t)P^{Total,Antenna}(t)}{\gamma(t)P_N^{Antenna}} =$$
$$= \frac{P^{Total,Antenna}(t)}{P_N^{Antenna}}$$
$$= N_R^{Antenna}(t)$$

where $N_R^{DigitalReceiver}(t)$ and $N_R^{Antenna}(t)$ are the noise rise ratios as measured at the digital receiver 3 (FIG. 1) and at the antenna 1 (FIG. 1), respectively, $P^{Total,DigitalReceiver}(t)$ and $P^{Total,Antenna}(t)$ are the total received powers at the digital receiver 3 and the antenna 1, respectively, and $P_N^{DigitalReceiver}$ and $P_N^{Antenna}$ are the thermal noise level as measured at the digital receiver 3 and the antenna 1, respectively. However, note that (1) requires measurement of the noise floor $P_R^{DigitalReceiver}$ in the digital receiver. This is a major difficulty that is addressed by the present invention.

Power Measurements

In the detailed description the following general notations are used:

Measurements of the total received wideband power are performed in the receiver. This measurement is denoted by $P^{Total}(t)$, where t denotes discrete time. The measurement rate is $T^{-1}$ Hz.

Code power is in the present disclosure used to denote a radio link power associated with each individual code that is used in the WCDMA system. The general term "radio link power" is considered to comprise the general term "code power", however, in the present disclosure where WCDMA is the exemplifying system, the two terms could be considered as equivalent. Measurement of code power may be performed in the receiver, for controlled channels of the cell. These measurements are denoted by $P_{i,Measurement}^{Code}(t)$. The measurement rate is $T_i^{-1}$ Hz.

The code power of the data channel i (CS or PS), denoted $P_i^{Code,Data}(t)$, corresponding to control channel i, denoted $P_i^{Code,Control}$ is not measured directly. Instead it is slaved to the actual received code signal power as $$P_i^{Code,Data}(t) = n_{Code}(\beta_i^{Data}(t)/\beta_i^{Control}(t))^2 P_i^{Code,Control}(t) \equiv \eta_i(t) P_i^{Code,Control}, \quad (2)$$

where the scale factor $\eta_i(t)$ depends on the service and is known in the receiver at any given instance of time, possibly delayed to after TFCI decoding, $n_{code}$ denotes the effective number of codes used in the connection and $\beta_i^{Data}(t)$ and $\beta_i^{Control}(t)$ are the so called β-factors, whose squared quotient define the power relation between control signalling and data traffic for a user.

All sampling periods are such that there is a smallest sampling period so that all other sampling periods are integer multiples of this sampling period.

The quantity that will be used throughout the disclosure is $P_i^{Code}(t))$ that is used to denote the sum of control signal power and data channel power for the total channel i. Note that the measurement $P_{i,Measurement}^{Code}(t)$ measures only the control channel power. Hence in the ideal noise free situation $$P_{i,Measurement}^{Code}(t) = \frac{1}{1+\eta_i(t)} P_i^{Code}(t). \quad (3)$$

Power Control Loop

Figure 2:
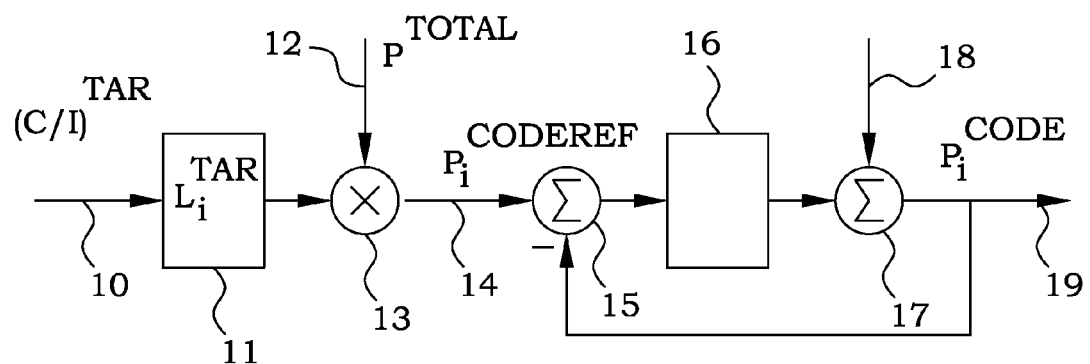
FIG. 2 shows a simplified typical model of power control.

In FIG. 2, a model of a simple power control loop for a channel i is illustrated. A target 10 for the code power to interference ratio, denoted as $(C/I)^{Tar}$, is provided and based on this, a load factor $L_i^{Tar}$ is computed 11, which represents the relation between a total power 12, denoted as $P^{Total}$, and a code power reference value 14 for the channel, denoted as $P_i^{CodeRef}$. Hence, the load factor $L_i^{Tar}$ is multiplied 13 by the total power 12 to provide the code power reference value 14. A code power $P_i^{Code}$ is subtracted 15 from the code power reference value 14 to achieve any deviation from the desired one and the difference is used as an input to an inner loop controller 16. The inner loop controller operates e.g. in order to achieve a zero steady state error. An error term 18 is typically added 17 to an output from the inner loop controller 16, giving the measured output channel power 19 of the channel i, denoted as $P_i^{Code}$, c.f. above. This output power 19 is then used in the feedback to the subtractor 15.

Since the changes in output channel power 19 influences the total power 12, an outer power control loop is also present, connecting all output channel powers and the total power 12.

Noise Rise

As indicated in the background section, the result of introducing additional channels becomes an increase of the total power 12. As seen from FIG. 2, an increase in the total power 12 renders an increase in the output channel power 19. Via the outer power control loop, this in turn will increase the total power 12 further. For relatively low loads, and for relatively small additional loads, this control behaviour is typically stable under a certain threshold. However, when passing this threshold, or for very large additional loads, instability may occur.

Figure 3:
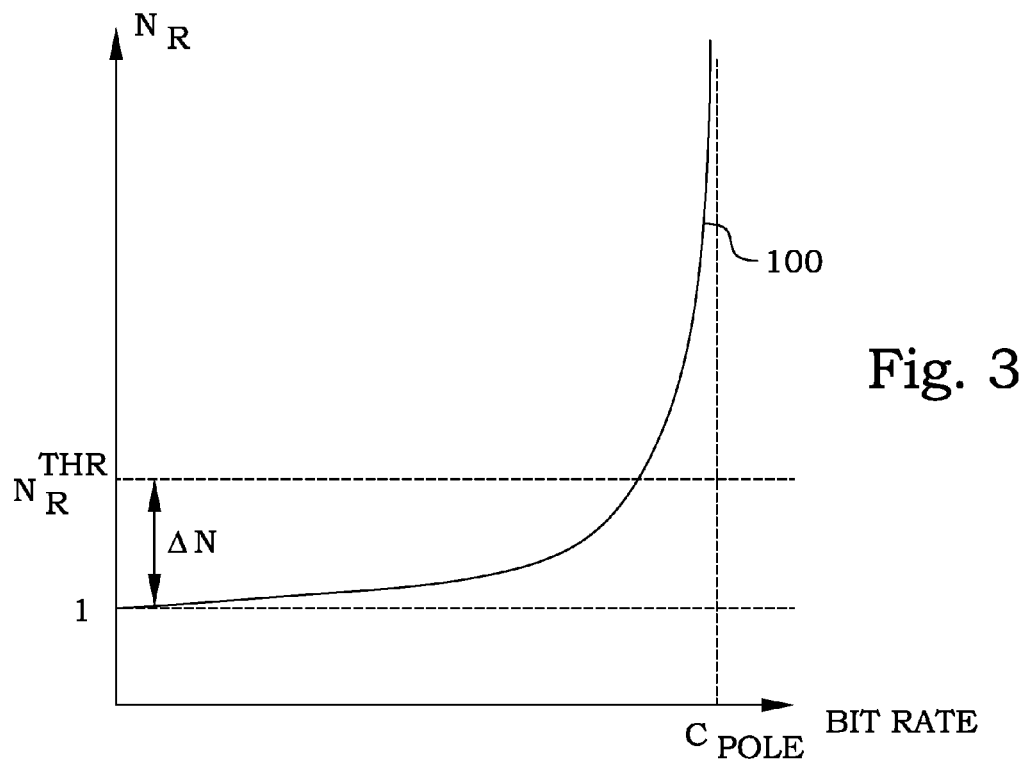
FIG. 3 illustrates a typical relation between noise rise and total bitrate in a cell.

FIG. 3 is a diagram illustrating these conditions. Noise rise $N_R$, defined as the ratio between a total power and the thermal noise level $P_N$ as measured at the antenna connector, also referred to as the noise floor, is a measure of the load. Above a noise rise threshold $N_R^{thr}$, the situation becomes unstable. A relation 100 between total bit rate and noise rise $N_R$ is known from the design of the control loops, and scheduling of additional channels can be performed once the instantaneous noise rise $N_R$ has been determined. The pole capacity, $C_{pole}$, denotes the maximum bitrate capacity in bits per second. A typical difference $\Delta N$ between the threshold $N_R^{thr}$ and the level defined by the thermal noise level $P_N$ is typically 7 dB. However, the noise floor or thermal noise level $P_N$ is not readily available. For instance, since scale factor uncertainties in the receiver may be as large as 2-3 dB as discussed above, a large part of the available margin is affected by such introduced uncertainties.

A mathematical approach to the estimation of powers and interference measures is presented in Appendix A.

Observability of Noise Floor

One reason for the difficulties to estimate the thermal noise floor power now appears, since even if all measurements are made in the digital receiver, the noise floor cannot be directly measured, at least not in a single RBS. The explanation is that neighbour cell interference and interference from external sources also affect the receiver, and any mean value of such sources cannot be separated from the noise floor. Power measurements on the own cell channels can be performed. Such measurements do however not solve the problem, although they may improve the situation somewhat.

Figure 4:
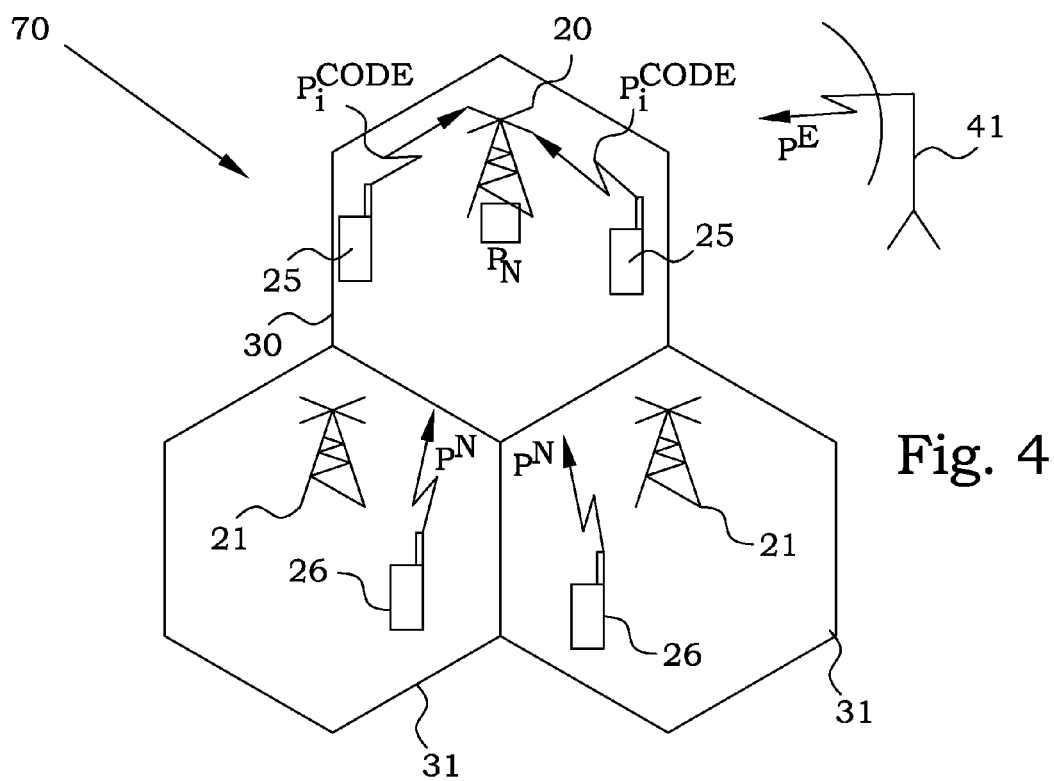
FIG. 4 is a schematic illustration of signal powers occurring in a typical mobile communications network.

FIG. 4 illustrates the contributions to power measurements in connection with an RBS 20. The RBS 20 is associated with a cell 30. Within the cell 30, a number of mobile terminals 25 are present, which communicates with the RBS 20 over different links, each contributing to the total received power by $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, the $P_N$ term arises from the receiver itself.

It is clear from the above that $P^N(t)$ and $P_N$ are not measurable and hence need to be estimated or eliminated in some way. This is further described in Appendix B.

As shown in Appendix B, the total wide band power measurement power measurement $P_{Measurement}^{Total}(t)$ can be expressed by:

$$P_{Measurement}^{Total}(t) = \sum_{i=1}^{n} P_i^{Code}(t) + P^{E+N}(t) + P_N(t) + e^{Total}(t), \quad (4)$$

where $$P^{E+N} = P^E + P^N, \quad (5)$$

and where $e^{Total}(t)$ models measurement noise.

It can be mathematically proved that a linear estimation of $P^{E+N}(t)$ and $P_N$ is not an observable problem. Only the sum $P^{E+N}+P_N$ is observable from the available measurements.

This is true also in case code power measurements are performed. Since both $P^{E+N}(t)$ and $P_N$ are positive quantities it is evident that each can not be estimated from the sum of the two. It also turns out that there is no mathematical modelling available making it possible to eliminate one of $P^{E+N}(t)$ and $P_N$. In other words, the problem is that there is no conventional technique that can be used to separate the noise floor from power mean values originating from neighbour cell interference and in-band interference sources external to the cellular system. As it turns out, only the sum of the power of the noise floor and the power of the neighbour and external interference can be observed. A simplified way to state this fact is that in case the sum of two (positive) numbers is known, then this information alone is not sufficient to determine each of the two numbers.

Noise Floor Estimations

Yet another reason for the difficulty with noise rise estimation is that the thermal noise floor is not always the sought quantity. There are situations where constant in-band interference significantly affects the receiver of the RBS. These constant interferers do not affect the stability discussed above, they rather appear as an increased noise temperature, i.e. an increased thermal noise floor.

In prior art, one alternative is to use costly and individual determination of the thermal noise floor of each RBS in the field, in order to achieve a high enough load estimation performance. The establishment of the default value for the thermal noise power floor, as seen in the digital receiver requires reference measurements performed over a large number of RBSs either in the factory or in the field. Both alternatives are costly and need to be repeated as soon as the hardware changes.

The above approach to solve the problem would require calibration of each RBS individually. This would however be very costly and is extremely unattractive. Furthermore, temperature drift errors in the analogue signal conditioning electronics of perhaps 0.7-1.0 dB would still remain.

Accepting the fact that only the sum $P^{E+N}+P_N$ can be observed from measurements of total wideband power and code powers for all channels, it must be investigated if any useful information still can be deduced. The present invention aims to achieve a solution that circumvents the problems listed above. One particular problem necessary to circumvent is that the noise floor is a quantity that is not observable from measurements that can be made available in the RBS.

One principle for estimation of the thermal noise power floor is to estimate it as a minimum of a measured or estimated power quantity. This minimum is typically computed over a pre-determined interval of time. The power in question is preferably either the sum of the power of the noise floor and the power of neighbour and external interference, or the total received wideband power. One approach would therefore be to calculate the noise rise from one of the above two minimum quantities, by a division of the momentary total received wideband power with the established thermal noise floor power.

The principle of using a division with an established thermal noise floor power has a number of properties, some of which may be disadvantages, at least in certain applications. The estimation principle establishes a specific value of the thermal noise power floor, as the output variable. This is neither optimal nor necessary. The output quantity that is really needed is the noise rise, and as will be seen below, this quantity can be estimated directly. Furthermore, the estimation principle does not provide any measure of the accuracy of the estimated thermal noise power floor, nor the noise rise. This is a consequence of the fact that only one value of the thermal noise power floor is estimated.

Moreover, the estimation principle does not account for prior information that is available on e.g. the probability distribution of the true thermal noise floor power, over a collection of RBSs. This has further consequences. The estimate of the thermal noise power floor obtained by the above ideas is always biased to be higher than the true value. This follows since the sum of thermal noise floor power, neighbour cell WCDMA power and non-WCDMA in-band interference power is always at least as great as the thermal noise power floor. Hence, when the minimum is estimated over a determined interval of time, a value larger than the true thermal noise power is always obtained. A consequence of this is that the noise rise is underestimated, i.e. the load of the cell is underestimated. The consequence could be too aggressive scheduling, leading e.g. to cell instability.

Preferred Embodiment of a Device According to the Present Invention

In the present invention, the goal of the determination is an estimate of the one dimensional probability density function of the noise rise, not just a single value. An important benefit of the fact that the complete probability distribution is estimated is the possibility to compute the variance (standard deviation) of the estimate. Thereby the quality of the estimation process will automatically be assessed. Uncertainty measures like this one are likely to be highly useful when e.g. enhanced uplink channels are scheduled in later steps.

Figure 5:
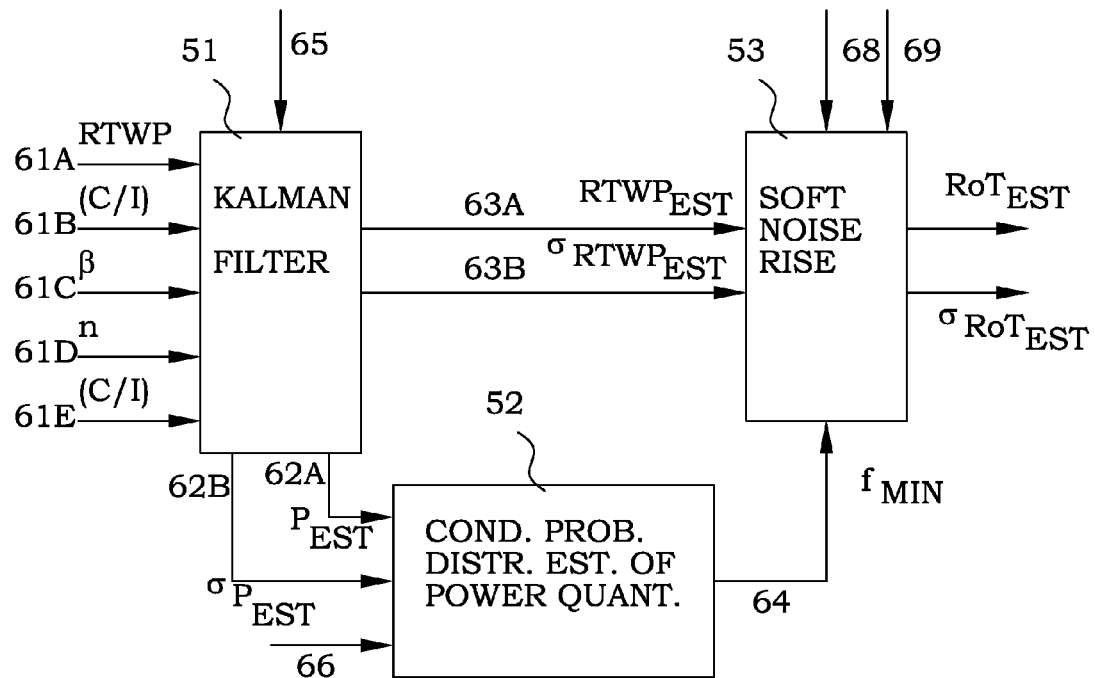
FIG. 5 is a schematic illustration of functionalities of a preferred embodiment of the present invention.

A preferred embodiment of the present invention is schematically illustrated as a block diagram in FIG. 5. The preferred embodiment relates to the field of load estimation in code division multiple access cellular telephone systems. The disclosure of the preferred embodiment is written for load estimation functionality with respect to the enhanced uplink (E-UL) in WCDMA type cellular systems. Note however, that the situation for other cellular systems of CDMA type should be similar so most of the detailed discussion should be valid for these systems as well.

Note that in the following description, probability distributions are handled by digital systems, typically by discretising the distributions as histograms.

The optimal nonlinear noise rise estimation arrangement comprises three main blocks. In a first, power estimation block 51, a Kalman filter arrangement receives a number of inputs 61A-E, e.g. the measured received total wideband power RTWP 61A, and provides outputs 62A, 62B, 63A, 63B, which are power estimates 62A, 63A and corresponding standard deviations 62B, 63B. In the presently preferred embodiment, the input 61A is as mentioned above the measured received total wideband power RTWP 61A. Furthermore, input 61B is the measured code power to interference ratio (C/I) of channel i, input 61C are the beta factors for channel i, input 61D is the number of codes for channel i, and input 61E is the corresponding code power to interference ratio commanded by the fast power control loop. The output 62A is the estimate of a power quantity being the sum of neighbour cell WCDMA interference power, in-band non-WCDMA interference power and thermal noise floor power, and the output 63A is the estimated received total wideband power and the output 63B is the corresponding variance. Since the outputs are from the Kalman filter arrangement, these parameters are the only ones needed to define the estimated Gaussian distributions that are produced by the filter. Thus, enough information is given to define the entire probability distribution information of the power estimates.

Dynamic state space models 65 and the time variable Kalman filter 51 are described more in detail in Appendix C.

In a second, conditional probability distribution estimation block 52, an arrangement based on Bayesian statistics receives the power estimate 62A and the corresponding standard deviations 62B as inputs, and provides an output 64 comprising the estimated probability distribution of an extreme value, typically the minimum, of $P_{Estimate}^{E+N+Noise}$, which is an estimate of the sum of neighbour cell interference power, external inband interference power and thermal noise power. Parameters 66 giving information about a prior expected probability distribution of the noise floor power is provided to the conditional probability distribution estimation block 52, in order to achieve an optimal estimation. A more detailed description of the estimation of the conditional probability distribution is given in Appendix D.

In a third, noise rise estimation block 53, an arrangement based on Bayesian statistics receives the estimated probability distribution of the minimum of $P_{Estimate}^{E+N+Noise}$ 64, the power estimate 63A and the corresponding standard deviations 63B as inputs, and provides primarily an output 67 comprising estimated noise rise $RoT_{Estimate}$ and the corresponding standard deviation $\sigma_{RoT,Estimate}$. In this embodiment, the preferred noise rise measure is defined according to:

$$RoT(t) = \frac{P^{Total}(t)}{P_N}, \quad (6)$$

where $P^{Total}(t)$ is a total received power,
however, also other noise rise measures can be utilized.

Parameters 68 giving information about which noise rise measure to be used is in this embodiment provided to the noise rise estimation block 53 and preferably also prior expected probability distribution of the noise rise 69. A more detailed description of the conditional probability distribution is given in Appendix E.

The estimated noise rise $RoT_{Estimate}$ and the corresponding standard deviation $\sigma_{RoT,Estimate}$ are typically computed as the conditional means, based on the estimated conditional probability distribution of the noise rise. This is the optimal estimate of the noise rise, and it is further described in Appendix F.

The present disclosure of the preferred embodiments reveals detailed nonlinear algorithms that are theoretically optimal. In the first block 51 in the preferred embodiment, the powers of the radio links of the own cell are not subtracted directly from the received total wideband power. Instead optimal state space filtering techniques, in this embodiment Kalman filtering, are applied to estimate a signal being the sum of neighbour cell WCDMA power, non-WCDMA in-band interference and the thermal noise power floor. The risk that measurement disturbances on high power radio links would produce outliers that would hamper any calculation of the minimum of the above signal, is minimized by this approach.

The Kalman filtering approach further has the following advantages. It can handle quickly time varying systems by introducing predicted variations in the Kalman model. This is ideal when the bursty data traffic of high power WCDMA radio links are filtered. Other techniques for filtering of strongly time variable signals normally introduces smearing. A Kalman filter is instead capable of filtering out measurement errors, even though the system that generates the signal is quickly time varying in a known way. In the present application, the fast time variability is modelled by the actual beta factors of each decoded radio link. These beta factors describe the time variation e.g. of highly bursty data traffic in the WCDMA system.

Furthermore, Kalman filtering is able to use physical prior information to provide an automatic calculation of optimal time variable filtering gains. In particular, the Kalman filters proposed in the preferred embodiment contains an embedded model of the fast power control loop that controls each radio link. Prior estimates on model accuracy and modelling errors are used to automatically compute the gains of the Kalman filter.

The outputs of the Kalman filtering block consist of Gaussian probability distributions, parameterized by estimates and their estimated variances.

The present method preferably uses frequent measurements of the received wideband power (RTWP) 61A and, possibly indirect, measurements of the individual powers of all radio links of the own cell, deduced from the code power to interference ratio values 61B.

Furthermore, according to the present invention, the estimate of the noise rise in block 53 is performed directly without necessarily establishing an intermediate value of the thermal noise power. This estimate is also allowed to account for any prior information has the potential to avoid the overestimation problems. One of the two Gaussian probability distributions outputted from the Kalman filtering is used for performing an estimation of the probability distribution of the minimum power of the received samples of the probability distribution. The estimation is performed on samples collected from a pre-determined interval of time that forms a sliding window. In addition the estimation process accounts for a prior probability distribution of the thermal noise power floor, as established for a representative collection of RBSs. This has some remarkable benefits.

Pure determinations of minimum power values necessarily overestimate the thermal noise power floor. This is avoided by the above approach. The reason is that the estimation of the probability distribution of the minimum power operates by cutting out pieces of the prior distribution, when a measured sample of the Gaussian probability distribution that is processed has its maximum close to the maximum of the prior probability distribution. This in turn pushes the centre of gravity of the estimated probability distribution towards lower values. It is actually possible to obtain values of the centre of gravity that fall somewhat below the true thermal noise floor power of a particular RBS. Technically, this is a property of the Bayesian statistical methods that are used, and this results in optimally small errors when evaluated over a representative collection of RBSs.

Furthermore, the sensitivity to outliers is reduced, since the estimation of a probability distribution of the minimum power is an algorithm of soft type.

In the last part of a preferred embodiment an exact estimate of the conditional probability distribution of the noise rise is first calculated. This is performed by exploiting exact expressions for the distribution of the quotient of two random variables. The numerator is represented by the estimated Gaussian distribution of the momentary received total wide band power, obtained directly from the Kalman filter. The denominator is represented by the estimated conditional probability distribution of the minimum power. One major benefit is the possibility to use the estimated probability distribution of the noise rise also for computation of the standard deviation of the estimate, thereby providing an estimate of the accuracy of the estimator.

Examples of Implementation of the Present Invention

In addition to the above algorithms, the interfacing of them into the existing RBS system needs some enhancements. The purpose of this section is to discuss these.

Figure 6:
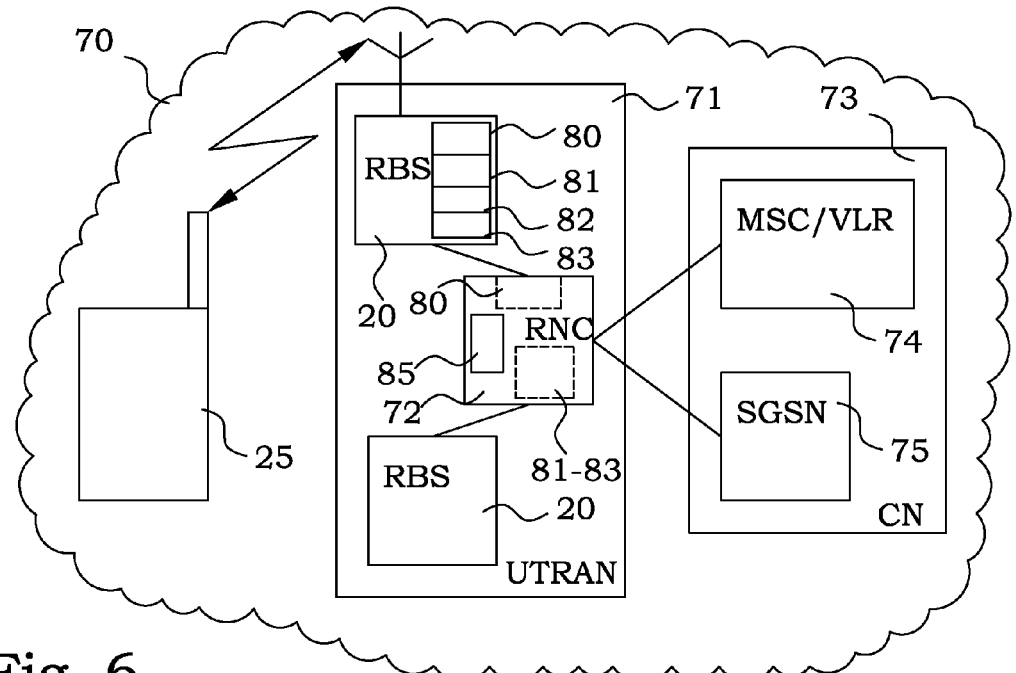
FIG. 6 is a block diagram of main parts of an embodiment of a system according to the present invention.

In the description above, it is assumed that the power estimations concern uplink communication. The power measurements are in such cases performed by a node in the radio access network, typically the radio base station. However, at least parts of the procedure, e.g. the determining and/or estimating steps may also be performed in other parts of the communication network, e.g. in a radio network controller. FIG. 6 illustrates main parts of an embodiment of a system according to the present invention. A wireless communications system 70 comprises a Universal mobile telecommunication system Terrestrial Radio Access Network (UTRAN) 71. A mobile terminal 25 is in radio contact with a RBS 20 in the UTRAN 71. The RBS 20 is controlled by a Radio Network Controller (RNC) 72, which in turn is connected to a Mobile services Switching Centre/Visitor Location Register (MSC/VLR) 74 and a Serving General packet radio system Support Node (SGSN) 75 of a core network CN 73.

In this embodiment, the RBS 20 comprises means for obtaining measurements 80 of at least instantaneous received total wideband power and in this particular embodiment also code powers, means for estimating 81 a probability distribution of a received total wideband power quantity from the measured powers. The RBS 20 further comprises means for providing 82 a conditional probability distribution of a noise rise measure, based on the estimated probability distribution of the received total wideband power quantity, and means for calculating 83 a noise rise measure value based on the provided conditional probability distribution of the noise rise measure. These means 80-83 can be implemented as separate units or as at least partly integrated units.

When implementing an evaluation according to FIG. 5, the means for estimating 81 is further arranged to provide estimated probability distributions also of the sum $P^{E+N+Noise}$, i.e. the entire Kalman power estimation functionality. Furthermore, the means for providing 82 is further arranged to estimate the conditional probability distribution of a noise floor, i.e. a minimum value of the $P^{E+N+Noise}$ quantity. The noise rise conditional probability distribution estimation is thereby also based on this noise floor conditional probability distribution. The means for providing 82 thereby comprises the estimation functionality 52 (FIG. 5) and part of the estimation functionality 53 (FIG. 5). The means for calculating 83 then comprises remaining parts of the estimation functionality 53 (FIG. 5).

In FIG. 6, the radio network controller comprises, among other functionalities, means 85 for admission control. The means 85 for admission control comprises preferably functionality for enhanced uplink control. The means 85 for admission control is connected to the RBS 20 for information exchange, in particular concerning noise rise estimates.

In an alternative embodiment, the means 81-83 are instead comprised in the RNC 72, as indicated by the dashed box in FIG. 6. At least a part of the actual measuring remains typically in the RBS 20 due to the proximity of the antenna. However, communication means 80 for receiving data representing at least received total wideband power is present. Also other alternative configurations of the means 80-83 are possible, as anyone skilled in the art realises. In the case the means 80-83 is present in the radio network controller 72, the means 80-83 are preferably integrated with the means 85.

Alternative Embodiments

As formulated in the discussion so far, the noise rise estimation process aims at estimating the total noise rise of the cell, according to (6 or A4). It is however straightforward to handle other related alternatives, within the same framework. As an example consider the following noise rise measure, describing the noise rise due only to radio links of the own cell. In such a case, the noise rise definition corresponding to (6) becomes $$N_R^{TPC} = \frac{P_N + \sum_{i=1}^{n} P_i^{Code}(t)}{P_N}. \tag{7}$$

The distribution of the sum of radio link powers can be obtained from the Kalman filter using:

$$\sum_{i=1}^{n} \hat{P}_i^{Code}(t) = (1 \; \wedge \; 1 \; \; 0) \hat{x}(t|t), \tag{8}$$

where $\hat{x}(t|t)$ is the estimated state vector, from which the Gaussian probability distribution of the sum follows. The conditional distribution of $\hat{P}_N(t'|t)$ is given by the conditional probability distribution for the noise floor, as described in appendix E. The procedure is then to first compute the distribution of the numerator by application of the formula for the distribution of the sum Z=X+Y of two independent probability distributions:

$$f_Z(z) = \int_{-\infty}^{\infty} f_X(x) f_Y(z-x) dx. \tag{9}$$

The so obtained distribution replaces the Gaussian distribution of the numerator of (E1), to be used according to the derivation of (E7). The rest of the procedure is identical to the calculation of the conditional probability distribution for the noise rise that is described above. Note that again the procedure has a low complexity due to the fact that all involved probability distributions are one dimensional.

Other noise rise measures are also possible. One alternative is to exclude or ignore any contributions from non-communication-system interference. This can be obtained by selection of a significantly shorter sliding window than what is used for RoT estimation. In contrary, also the noise rise caused only by external interference and neighbour cell interference can be considered. Furthermore, noise rise of the cell including only enhanced uplink radio links, i.e. no external interference and no WCDMA neighbour cell interference and no non-enhanced uplink TPC radio link power, can also be used.

In the preferred embodiment, both RTWP and individual powers of all radio links are measured and incorporated in the Kalman filtering procedure. However, alternatively, only frequent measurements of the RTWP 61A can be used. The Kalman filtering will then be performed without states corresponding to the individual radio links, which will simplify the processing. However, estimates of the noise floor then has to be based on Kalman estimates rendering the probability distribution of the total power, which makes the estimates less accurate.

Power models and Kalman filters for such an embodiment are presented in the later parts of Appendices B and C.

The choice of powers to measure may vary depending on e.g. the requested noise rise measure one wants to estimate.

Common for all alternatives is, however, that a power quantity is measured, on which a noise rise measure is based.

Additional Features

Radio Link Addition

When a radio link is added, the dimension of the Kalman filter/Kalman smoother changes (see Appendix C). This could be handled e.g. by re-initializing a new estimator, of a higher dimension. The initial values for the previously present states are then taken from the previous estimator and new initial values are set for the added states. This is done for state estimates and for covariances.

Note that this process has no effect on (F1) or (F2).

Radio Link Deletion

When a radio link is deleted, the dimension of the Kalman filter/Kalman smoother changes. This could be handled e.g. by re-initializing a new estimator, of a lower dimension. The initial values for the previously present states are then taken from the previous estimates. This is done for state estimates and for covariances.

Note that this process has no effect on (F1) or (F2).

Random Access Power Suppression

When a terminal connects to the network, its power is automatically ramped up until detection takes place, cf. [1], page 111. This may result in power spikes in $P^{E+N+Noise}(t)$ and in $P^{Total}(t)$. Unless this is handled, unwanted momentary errors may result in the corresponding estimates.

Anyway, this type of power spikes could be handled by additional logic, limitation of change rates of estimates, or by the introduction of a multiple-mode type Kalman filter/Kalman smoother. Such filters could e.g. be constructed around the IMM-filter concept, originally developed for target tracking applications.

Restart

At restart, the initial transient of the noise floor probability distribution estimation step makes itself evident unless estimates of $P^{E+N+Noise}(t)$ are backed up for a period of time equal to the duration of the sliding window.

Numerical Illustration

In order to illustrate the performance of the proposed algorithms a set of MATLAB scripts were developed. An example simulation was performed over 30 minutes.

Figure 7:
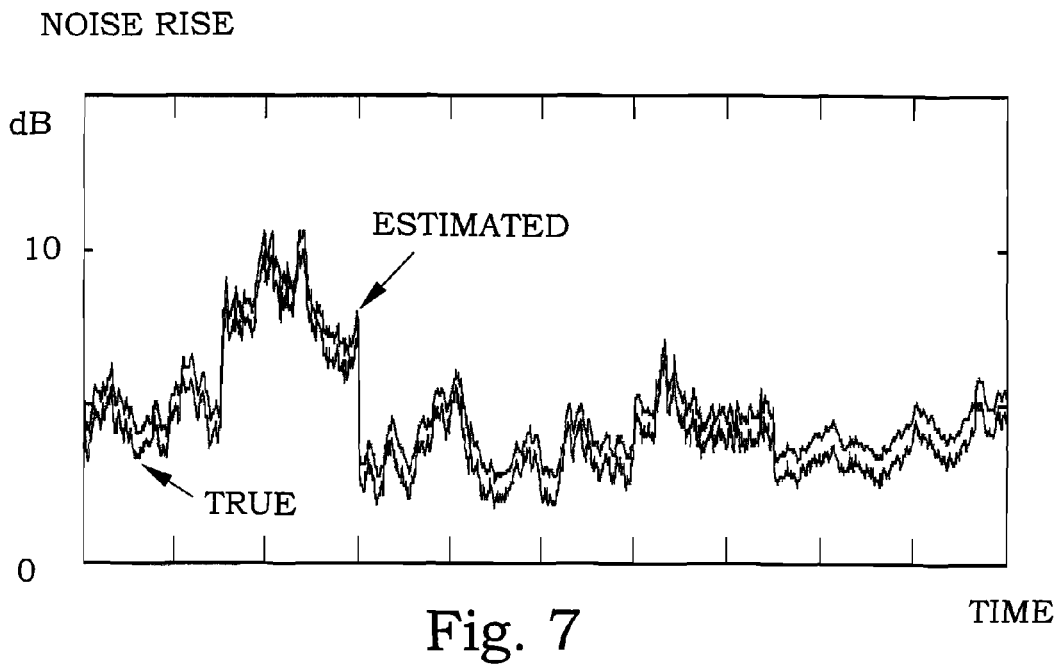
FIG. 7 is a diagram illustrating noise rise estimation results of a simulation according to an embodiment of the present invention.

In FIG. 7, estimated and true noise rise generated by simulation and used for evaluation of the algorithms are illustrated.

The simulated example indicates that the proposed methods have the potential to produce noise rise estimates that are accurate to within less than one dB of the true noise rise. A more detailed simulation study is however needed to establish the performance under a wider set of operating conditions, and to compare the result to other methods.

Note that the application of a prior distribution of the thermal noise power level, over an ensemble of RBSs, may give the proposed method a benefit. The reason is that the thermal noise level may be reached even though power measurements stay significantly above the sought noise floor. The measurements then cut away high power parts of the prior distribution, thereby moving the centre of gravity of the conditional distribution to lower powers. The conditional mean is hence not limited to values greater than or equal to the power measurements used to form the minimum. A consequence is that the tendency to overestimate the noise floor is reduced. This is beneficial since it corresponds to a reduced tendency to underestimate the noise rise, a fact that reduces the risk of a too aggressive scheduling.

Preferred Embodiment of a Method According to the Present Invention

Figure 8A:
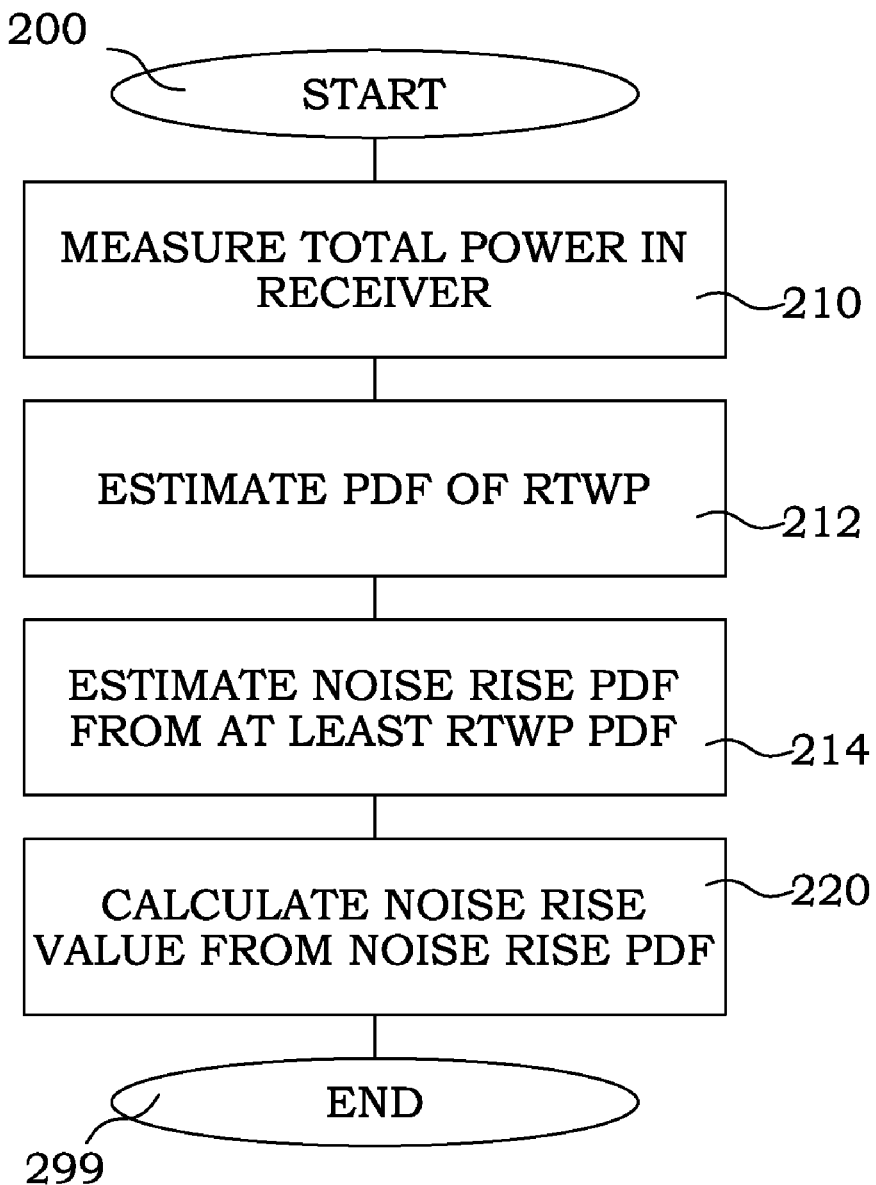
FIG. 8A is a flow diagram of main steps of an embodiment of a method according to the present invention.

FIG. 8A is a flow diagram of main steps of an embodiment of a method according to the present invention. The procedure starts in step 200. In step 210 an instantaneous received total wideband power is measured in a receiver. A probability distribution of a received total wideband power quantity is estimated in step 212 from the measured received total wideband powers. In step 214, a conditional probability distribution of a noise rise measure is provided, based at least on the estimated probability distribution of the received total wideband power quantity. A value of the noise rise measure is calculated in step 220, based on the conditional probability distribution of the noise rise measure. The procedure ends in step 299.

Figure 8B:
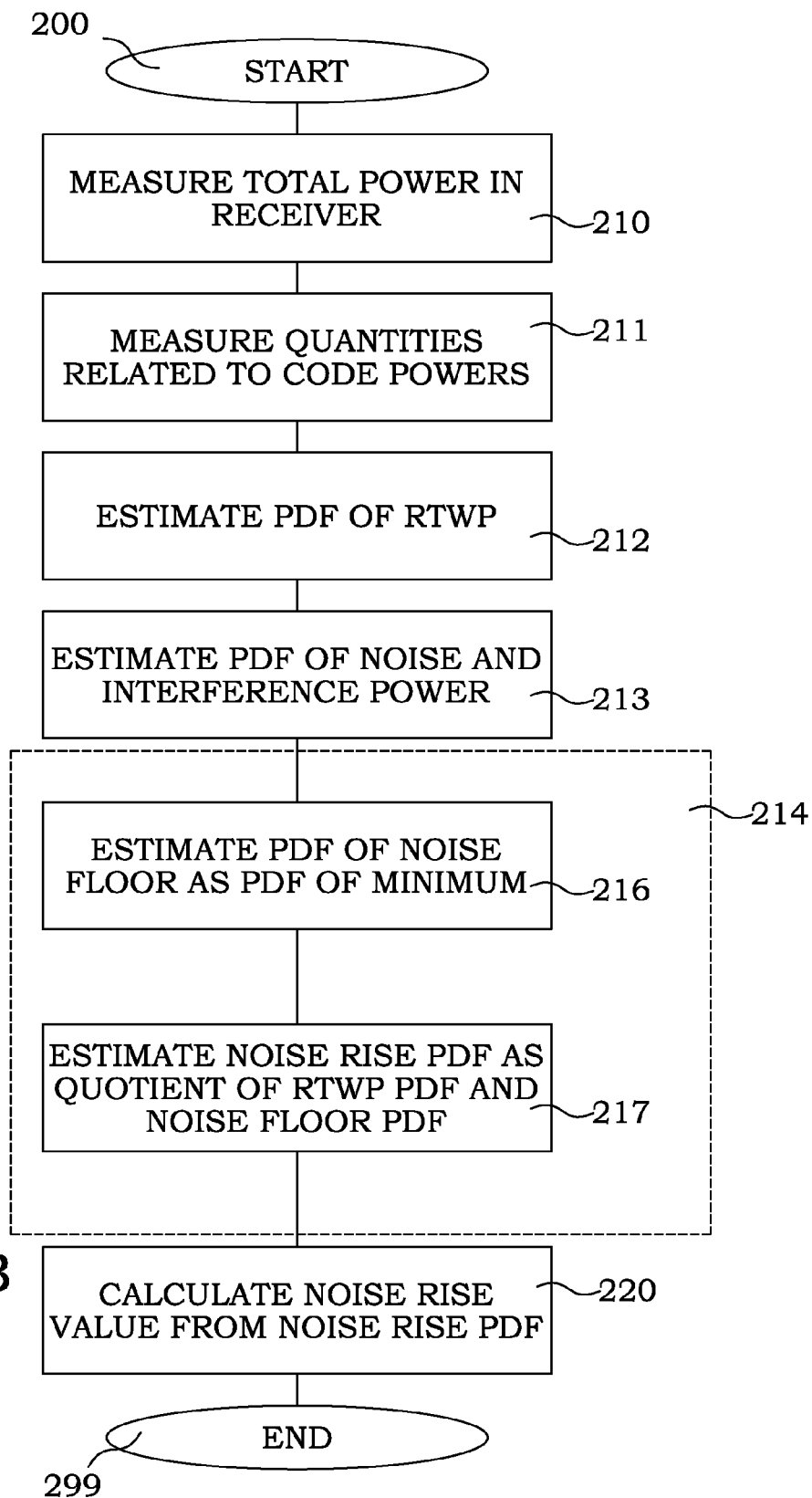
FIG. 8B is a flow diagram of main steps of an embodiment of a method according to the present invention.

FIG. 8B is a flow diagram of a little bit more elaborate embodiment of a method according to the present invention. Steps that are similar as in FIG. 8A are not discussed in detail another time. In step 211, instantaneous radio link powers of an own cell are measured or quantities directly connected thereto. A probability distribution of $P^{E+N+Noise}$ is estimated in step 213 from the measured instantaneous radio link powers and the measured total power. The step 214 comprises in this embodiment two substeps. In step 216, a conditional probability distribution of the minimum value of $P^{E+N+Noise}$ is estimated. The conditional probability distribution of the noise rise measure is estimated in step 217 by estimating a conditional probability distribution of a quotient between the probability distribution of the received total wideband power quantity and the conditional probability distribution of the minimum value of $P^{E+N+Noise}$.

Advantages of the Invention

Some of the advantages of the present invention are:

The disclosed algorithms for noise rise estimation avoid the problem with RBS front end scale factor errors, by the estimation of a relative load measure ("noise rise") in the digital receiver.

The disclosed algorithms can be set up for different sets of measurements. One important case is where only the received total wide band power is used for noise rise estimation. Another case is where additional measurements of radio link powers are also performed individually, for each radio link of the cell.

The disclosed algorithms can account for:
  momentary beta factors and setting of SIR targets; and
  the prior distribution of the thermal noise power floor, established over a representative collection of RBSs.

As a consequence of the application of a time variable Kalman filter, highly bursty power signals can be accurately tracked.

The soft operation of the algorithms, together with the fact that optimal filtering is applied for power subtraction of powers of radio links of the own cell reduce the risk of poor estimates of the thermal noise power floor, e.g. due to measurement errors of high power radio links.

The computational complexity of the algorithms can be kept reasonably low by the reduction of the noise rise estimation problem to a one-dimensional one, by a first Kalman filtering step.

The algorithms can, with trivial modifications, be used for estimation of a number of specific noise rise estimates. These include e.g.:
  The complete noise rise of the cell, as expressed by the RoT.
  The noise rise of the cell, excluding non-WCDMA interference. This can be obtained by selection of a significantly shorter sliding window than what is used for RoT estimation.

The noise rise of the cell, caused only by external interference and WCDMA neighbour cell interference.

The noise rise of the cell, including only normal radio links, i.e. no external interference, no WCDMA neighbour cell interference and no enhanced uplink interference.

The noise rise of the cell including only enhanced uplink radio links, i.e. no external interference, no WCDMA neighbour cell interference and no non-enhanced uplink TPC radio link power.

In general words, the present invention can be summarized as:

"Optimal noise rise estimation algorithms that, based on soft priors and power measurements, estimate the conditional probability distribution of the noise rise, followed by computation of an optimal estimate."

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Powers, Load Factors and Noise Rise

A mathematical approach to the powers and interference measurements is presented here. Powers and interference measurements are defined before de-spreading. If values after de-spreading are sought, a scaling with the spreading factor is needed. Similar scaling can be applied in order to transform quantities to any level of the signal processing chain. In order to be consistent with the above main assumption, the code power-to-interference ratio (C/I) referenced below refers to the code power-to-interference ratio before de-spreading. This is sometimes reflected by the notation $(C/I)_{chip}$ where the subscript $_{chip}$ refers to the powers at chip rate.

The interference level for the control channel i by definition obeys:

$$(C/I)_{chip,i}(t) = \frac{P_i^{Code,Control}(t)}{P^{Total}(t) - P_i^{Code,Control}(t)} \Longleftrightarrow$$

$$P_i^{Code,Control}(t) = \frac{1}{1 + \frac{1}{(C/I)_{chip,i}(t)}} P^{Total}(t) \Longleftrightarrow$$

$$P_i^{Code}(t) = \frac{1 + \eta_i(t)}{1 + \frac{1}{(C/I)_{chip,i}(t)}} P^{Total}(t)$$

(A1)

where $P_i^{Code,Control}(t)$ is the code channel powers for control channels i, $P^{Total}(t)$ is a total received power, and $\eta_i(t)$ is a known scale factor between control and data channel powers, c.f. (2).

Hence, it follows that a load factor $L_i^{Tar}(t)$, commanded by the outer power control loop (c.f. FIG. 2), can be expressed as:

$$L_i^{Tar}(t) = \frac{1 + \eta_i(t)}{1 + \frac{1}{(C/I)_{chip,i}^{Tar}(t)}},$$

(A2)

where $^{Tar}$ refers to target values.

Note again that the time index indicates the (slow) outer power control loop update of the relative interference value.

Also note that a corresponding relation between code power $P_i^{Code}(t)$ and total power $P^{Total}(t)$ before de-spreading, expressed in terms of the SIR (Signal-to-Interference Ratio) value, defined after de-spreading, is:

$$P_i^{Code}(t) = \frac{1 + \eta_i(t)}{1 + \frac{N_i}{SIR_i(t)}} P^{Total}(t)$$

(A3)

where $N_i$ is the spreading factor.

The sought quantity for load estimation is as mentioned earlier typically the noise rise, $N_R(t)$, defined by $$N_R(t) = \frac{P^{Total}(t)}{P_N},$$

(A4)

where $P_N$ is the thermal noise level as measured by the antenna connector. It remains to mathematically define what is meant with $P^{Total}(t)$. The definition used here is:

$$P^{Total}(t) = \sum_{i=1}^{n} P_i^{Code}(t) + P^{E+N}(t) + P_N,$$

(A5)

$$P^{E+N}(t) = P^E(t) + P^N(t)$$

(A6)

measured at the antenna connector. Here $P^N(t)$ denotes the power as received from neighbour cells and $P^E(t)$ denotes the power as received from sources external to the WCDMA system. The major difficulty is here the need to separate the thermal noise power $P_N$ from the interference from neighbour cells and external sources, $P^{E+N}(t)$.

APPENDIX B

Power Models

During periods where the target signal-to-interference ratio, $SIR_i^{Tar}(t)$, and hence $(C/I)_{chip,i}^{Tar}$ is unchanged, and where the power control is operating properly, the received code channel powers for control channels and corresponding steady state data channels should be relatively constant, assuming that the fast power control loop operates efficiently. A suitable dynamic model for code power, $P_i^{Code}$, is then given by a discrete time random walk:

$$P_i^{Code}(t+T_{min}) = P_i^{Code}(t) + w_i^{Code}(t).$$

(B1)

Here $w_i^{Code}(t)$ is assumed to be a zero mean white Gaussian disturbance. $T_{min}$ is the smallest sampling period of the system.

Note that a random walk is a suitable model since the powers $P_i^{Code}(t)$ are positive quantities. In case a model with a time constant would be included, it follows that also a positive input signal to that model would need to be introduced, and its value estimated. In particular, the random walk is a way to express that the estimated quantity is "almost constant".

On the other hand, in situations where $(C/I)_{chip,i}^{Tar}(t)$ changes, e.g. due to poor channel conditions, change of Radio Access Bearer (RAB) or varying packet traffic, a more general model is needed. Such a model can be included by the introduction of a simple model of the fast power control loop according to FIG. 2.

$(C/I)_{chip,i}^{Tar}(t)$ is being updated by the outer power control loop. By multiplying the load factor for the sum of the control and data channel parts of the channel with the total power $P^{Total}(t)$, the code power reference value for the channel, $P_i^{CodeRef}(t)$, is obtained.

In this more general case it is suitable to assume that the controller 16 (FIG. 2) contains an integrator operation in order to reach zero steady state error. In case a pure integrator is used, the difference equations for the code powers become:

$$P_i^{Code}(t+T_{min}) = P_i^{Code}(t) + K\left(P_i^{Code\ Ref}(t) - P_i^{Code}(t)\right) + w_i^{Code}(t), \quad (B2)$$

$$E[w_i^{Code}(t)w_i^{Code}(s)] = \delta_{t,s}\frac{T_{min}}{T_i}r_i^{Code}, \quad (B3)$$

$$P_i^{Code\ Ref}(t) = \frac{1+\eta_i(t)}{1+\frac{1}{(C/I)_{chip,i}^T(t)}} P^{Total}(t), \quad (B4)$$

$$i = 1, K, n.$$

$E[\ ]$ denotes statistical expectation, $\delta_{t,s}$ denotes the Kronecker delta, $r_i^{Code}$ resembles the average drift of $P_i^{Code}(t)$ during a time of $T_i$ and K is the integrator gain.

Here (1-K) should resemble the true time constant of the fast power control loop. Hence, (B1) and (B2-4) constitute two alternatives in the modelling of the control and traffic channels of the cell. Note that the model (B2-4) computes a reference power $P_i^{CodeRef}(t)$ as seen in the receiver. This reference power is the same value that the fast power control loop attempts to achieve. Therefore, when a change of $(C/I)_{chip,i}^{Tar}(t)$ is commanded, the transient of the power of the channel should be reasonably well modelled. The model is uncertain though, since the bit errors on the power commands make the actual commanded terminal power uncertain. This needs to be captured by the additive system noise $w_i^{Code}(t)$ of (B2).

Since no prior information about the external $P^E(t)$ and neighbour cell power $P^N(t)$ is available, it is natural to model them together as random walk, i.e.

$$P^{E+N}(t+T_{min}) = P^{E+N}(t) + w^{E+N}(t) \quad (B5)$$

where $w^{E+N}(t)$ is a Gaussian systems noise (c.f. (B1)-(B3)).

Also the thermal noise $P_N(t)$ is modelled by a random walk model, but with a very small Gaussian systems noise $w_N(t)$ $$P_N(t+T_{min}) = P_N(t) + w_N(t) \quad (B6)$$

The measurements performed in the digital receiver include the total received wideband power $P^{Total}(t)$, as well as the received control code powers $P_i^{Code,Control}(t)$ for all relevant channels i in the serving cell. The thermal noise level $P_N(t)$ and the interference from neighbour cells and external sources $P^{E+N}(t)$ cannot be directly measured. The code power measurements can be described as:

$$P_{i,Measurement}^{Code}(t) = \frac{1}{1+\eta_i(t)}P_i^{Code}(t) + e_i^{Code}(t), \quad (B7)$$

$$i = 1, K, n$$

$$E[e_i^{Code}(t)e_i^{Code}(s)] = \delta_{t,s}r_{i,Measurement}^{Code}, \quad (B8)$$

where $e_i^{Code}(t)$ is a Gaussian measurement noise. The division by $1+\eta_i(t)$ is due to the fact that only control channel power is measured.

The total wide band power measurement can be expressed by:

$$P_{Measurement}^{Total}(t) = \sum_{i=1}^{n} P_i^{Code}(t) + P^{E+N}(t) + P_N(t) + e^{Total}(t) \quad (B9)$$

$$E[e^{Total}(t)e^{Total}(s)] = \delta_{t,s}r_{Measurement}^{Total}. \quad (B10)$$

Here, $e^{Total}(t)$ models the measurement noise that affects the total wide band power measurement. Note that enhanced uplink channels can be treated within this framework.

For an embodiment being based on only frequent measurements of RTWP, a random walk model can be applied:

$$P^{Total}(t+T_{min}) = P^{Total}(t) + w(t) \quad (B11)$$

$$E[w(t)w(s)] = \delta_{t,s}\frac{T_{min}}{T_{Correlation}}r \quad (B12)$$

where $\sqrt{r}$ resembles the average drift of $P^{Total}(t)$ during a time of $T_{Correlation}$. $P^{Total}(t)$ denotes the current (unknown) true value of the RTWP to be estimated.

The measurement equation is:

$$P_{Measurement}^{Total}(t) = P^{Total}(t) + e(t) \quad (B13)$$

$$E[e(t)e(s)] = \delta_{t,s}r_{Measurement}, \quad (B14)$$

where the measurement noise $e(t)$ has a variance equal to $r_{Measurement}$.

APPENDIX C

Kalman Filter Based Power Estimation

Dynamic State Space Models

The sum $P^{E+N}(t)+P_N(t)$ is denoted by $P^{E+N+Noise}(t)$. Following (B5) and (B6), the model for $P^{E+N+Noise}(t)$ becomes:

$$P^{E+N+Noise}(t+T_{Min}) = P^{E+N+Noise}(t) + w^{E+N+Noise}(t) \quad (C1)$$

$$E[w^{E+N+Noise}(t)w^{E+N+Noise}(s)] = \delta_{t,s}\frac{T_{Min}}{T_{E+N+Noise}}r^{E+N+Noise}. \quad (C2)$$

The state vector is selected as:

$$x(t) = \begin{pmatrix} P_1^{Code}(t) \\ M \\ P_n^{Code}(t) \\ P^{E+N+Noise}(t) \end{pmatrix} \quad (C3)$$

and the measurement vector is selected as:

$$y(t) = \begin{pmatrix} P_{1,Measurement}^{Code}(t) \\ M \\ P_{n,Measurement}^{Code}(t) \\ P_{Measurement}^{Total}(t) \end{pmatrix}. \quad (C4)$$

The relations (B2), (B3), (B4), (B7), (B8), (B9), (B10), (C1), (C2), (C3) and (C4) then results in the following state space model:

$$x(t + T_{min}) = \begin{pmatrix} 1-K & 0 & 0 & 0 \\ 0 & O & & M \\ 0 & & 1-K & 0 \\ 0 & \Lambda & 0 & 1 \end{pmatrix} x(t) + \begin{pmatrix} K & 0 & 0 \\ 0 & O & 0 \\ 0 & 0 & K \\ 0 & \Lambda & 0 \end{pmatrix} \begin{pmatrix} P_1^{CodeRef} \\ M \\ P_n^{CodeRef} \end{pmatrix} + w(t) \quad (C5)$$

$$y(t) = \begin{pmatrix} \frac{1}{1+\eta_1(t)} & 0 & 0 & 0 \\ 0 & O & & M \\ 0 & & \frac{1}{1+\eta_1(t)} & 0 \\ 1 & \Lambda & 1 & 1 \end{pmatrix} x(t) + e(t) \quad (C6)$$

$$R_1 = E[w(t)w^T(s)] \quad (C7)$$

$$= \begin{pmatrix} \delta_{t,s} \frac{T_{Min}}{T_1} r_1^{Code} & 0 & 0 & 0 \\ 0 & O & & M \\ 0 & & \delta_{t,s} \frac{T_{Min}}{T_n} r_n^{Code} & 0 \\ 0 & \Lambda & 0 & \delta_{t,s} \frac{T_{Min}}{T^{E+N+Noise}} r^{E+N+Noise} \end{pmatrix}$$

$$R_2 = E[e(t)e^T(s)] \quad (C8)$$

$$= \begin{pmatrix} \delta_{t,s} r_{1,Measurement}^{Code} & 0 & 0 & 0 \\ 0 & O & & M \\ 0 & & \delta_{t,s} r_{n,Measurement}^{Code} & 0 \\ 0 & \Lambda & 0 & \delta_{t,s} r_{Measurement}^{Total} \end{pmatrix}$$

The Time Variable Kalman Filter

For state space models, like the ones given in the end of the previous appendix, the linear optimal estimator in the least mean square sense (LLMS) is given by the Kalman filter. An advantage of the Kalman filter is that this optimality still holds for linear systems that are time variable. This is exactly the case encountered above.

Following [2], p. 142 and p. 247, the Kalman filter for the state space model:

$$x(t+T_{Min}) = Ax(t) + Bu(t) + w(t)$$

$$y(t) = C(t)x(t) + e(t), \quad (C9)$$

is given by the following recursive vector and matrix relations:

$$K_f(t) = P(t|t-T_{Min})C^T(t)(C(t)P(t|t-T_{Min})C^T(t)+R_2(t))^{-1}$$

$$\hat{x}(t|t) = \hat{x}(t|t-T_{min}) + K_f(t)(y(t) - C(t)\hat{x}(t|t-T_{Min}))$$

$$P(t|t) = P(t|t-T_{Min}) - K_f(t)C(t)P(t|t-T_{Min})$$

$$\hat{x}(t+T_{min}|t) = A\hat{x}(t|t) + Bu(t)$$

$$P(t+T_{min}|t) = AP(t|t)A^T + R_1 \quad (C10)$$

The matrices A, B, C(t), $R_1$ and $R_2$ are either given explicitly in (C5)-(C8), or they follow by a direct comparison to (C9). The input vector u(t) is given by:

$$u(t) = \begin{pmatrix} P_1^{CodeRef}(t) \\ M \\ P_n^{CodeRef}(t) \end{pmatrix} = \begin{pmatrix} \frac{(1+\eta_1(t))(C/I)_{chip,1}^{Target}(t)}{1+(C/I)_{chip,1}^{Target}(t)} P^{Total}(t) \\ M \\ \frac{(1+\eta_n(t))(C/I)_{chip,n}^{Target}(t)}{1+(C/I)_{chip,n}^{Target}(t)} P^{Total}(t) \end{pmatrix} \approx \quad (C11)$$

$$\begin{pmatrix} \frac{(1+\eta_1(t))(C/I)_{chip,1}^{Target}(t)}{1+(C/I)_{chip,1}^{Target}(t)} \hat{P}^{Total}(t|t) \\ M \\ \frac{(1+\eta_n(t))(C/I)_{chip,n}^{Target}(t)}{1+(C/I)_{chip,n}^{Target}(t)} \hat{P}^{Total}(t|t) \end{pmatrix}.$$

Since the total power is not known, it may be replaced with the filter estimate in (C11), cf. (C14). An alternative would be to take the total power estimate directly as a measurement. Note that the use of the estimate may seem to be a minor change, it is however stressed that it is not. The reason is the feedback from the state vector that is introduced.

In order to run the Kalman filter, initial values are required for the state vector and for the covariance matrix iteration. These are as usual assumed to be Gaussian and are to be supplied by the user. The values needed are:

$$\hat{x}(t_0|t_0-T_{Min}) = x_0 \quad (C12)$$

$$P(t_0|t_0-T_{Min}) = P_0 \quad (C13)$$

The initial value for the state iteration should be selected as the one that is most likely, given the prior information. The initial value for the state covariance matrix should be chosen to reflect the uncertainty in the estimate of the initial state vector.

Before proceeding to the estimator for the minimum value, the filter estimate for the total power is stated. It is e.g. needed in the input signal generation. This follows by:

$$\hat{P}^{Total}(t|t) = (1 \Lambda 1 1)\hat{x}(t|t) = \sum_{i=1}^{n} \hat{P}_i^{Code}(t|t) + \hat{P}^{E+N+Noise}(t|t). \quad (C14)$$

The corresponding covariance can be computed by similar means:

$$(\sigma_{P^{Total}}^{Kalman})^2 = E[P^{Total}(t) - \hat{P}^{Total}(t)]^2 = (1\Lambda 11)E[x(t) - \hat{x}(t|t)][x(t) - \hat{x}(t|t)]^T (1\Lambda 11)^T \quad (C15)$$

Note that the Kalman filter produces state estimates and estimates of the covariance of the state estimates. Together with known properties of the Kalman filter, the result is a set of signals that represent samples of Gaussian probability distributions of the estimated states.

The outputs 62A, 62B, 63A and 63B referred to in connection with FIG. 5 are then given by:

$$\hat{x}_{n+1}(t|t) = \hat{P}^{E+N+Noise}(t|t) \tag{C16}$$

$$P_{n+1,n+1}(t|t) = \sigma_{pE+N+Noise}^{Kalman}(t|t) \tag{C17}$$

$$\hat{P}^{Total}(t|t) = (1\ \Lambda\ 1\ 1)\hat{x}(t|t) \tag{C18}$$

$$\sigma_{pTotal}^{Kalman}(t|t) = \sqrt{E\left[P^{Total}(t) - \hat{P}^{Total}(t|t)\right]^2} \tag{C19}$$

respectively. Here $\hat{x}_{n+1}(t|t)$ is the n+1:st component of the filter estimate, $P_{n+1,n+1}(t|t)$ is the corresponding covariance component. $P^{Total}(t)$ and $\hat{P}^{Total}(t|t)$ are true and estimated total powers.

The Kalman Smoother Extension

A theoretically optimal estimation of the minimum value requires that the Kalman smoother estimate is computed. While the Kalman filter is needed for the fast estimation of the total power, the smoother can be updated at much lower rates, thereby reducing the computational complexity. It could e.g. be enough to compute the smoother once every few minutes, followed by soft combining of these estimates in the minimum value estimation process. This is described further in later appendices.

Note that as it turned out later in the simulations, the performance gain of the Kalman smoother is not likely to be important. However, for completeness and in order to keep the theory consistent, the smoother is derived here.

The Kalman smoother aims at computing the estimates $\hat{P}^{E+N+Noise}(t'|t)$, $t' \in [t-T_{Lag}, t]$. This is the fixed point smoother, treated in e.g. [2], pages 149-150. It can be computed by an extension of the state vector of the conventional Kalman filter. The state vector extension that is needed is defined by:

$$\bar{x}(t) = \begin{pmatrix} x(t) \\ P^{E+N+Noise}(t'|t) \end{pmatrix} \tag{C20}$$

$$\bar{u}(t) = \begin{pmatrix} u(t) \\ 0 \end{pmatrix} \tag{C21}$$

$$\bar{A} = \begin{pmatrix} A & 0 \\ 0 & 0 \end{pmatrix} \tag{C22}$$

$$\bar{B} = \begin{pmatrix} B \\ 0 \end{pmatrix} \tag{C23}$$

$$\bar{C}(t) = (C(t)\ 0) \tag{C24}$$

$$\bar{R}_1 = \begin{pmatrix} R_1 & 0 \\ 0 & 0 \end{pmatrix} \tag{C25}$$

$$\bar{R}_2 = R_2. \tag{C26}$$

The derivation of the smoother equations then proceeds by consideration of the Riccati-equation that governs the time evolution of the covariance prediction matrix:

$$\bar{P}(t|t-T_{Min}) = \begin{pmatrix} P_{11}(t|t-T_{Min}) & P_{12}(t|t-T_{Min}) \\ P_{12}^T(t|t-T_{Min}) & P_{22}(t|t-T_{Min}) \end{pmatrix}. \tag{C27}$$

The Riccati-equation, and the corresponding gain (this gain is the Kalman predictor gain, not to be mistaken for the Kalman filter gain given by (C14)), are given by (see [2], pages 149-150):

$$\bar{P}(t+T_{Min}|t) = \bar{A}\bar{P}(t|t-T_{Min})\bar{A}^T + \bar{R}_1 - \bar{A}\bar{P}(t|t-T_{Min})\bar{C}^T(t) \tag{C28}$$
$$\left(\bar{C}(t)\bar{P}(t|t-T_{Min})\bar{C}^T(t) + \bar{R}_2\right)^{-1}\bar{C}(t)\bar{P}(t|t-T_{Min})\bar{A}^T$$

$$\begin{pmatrix} k_1(t) \\ k_2(t) \end{pmatrix} = \tag{C29}$$
$$\bar{K}(t) = \bar{A}\bar{P}(t|t-T_{Min})\bar{C}^T(t)\left(\bar{C}(t)\bar{P}(t|t-T_{Min})\bar{C}^T(t) + \bar{R}_2\right)^{-1}$$

Note that $k_2(t)$ is a row vector since there is more than one measurement. An insertion of (C20)-(C27) in (C28) and (C29), results in the following block equations:

$$P_{11}(t+T_{Min}|t) = AP_{11}(t|t-T_{Min})A^T + R_1 - AP_{11}(t|t-T_{Min})C^T$$
$$(t)(C(t)P_{11}(t|t-T_{Min})C^T(t) + R_2)^{-1}C(t)P_{11}$$
$$(t|t-T_{Min})A^T \tag{C30}$$

$$P_{12}(t+T_{Min}|t) = (A - AP_{11}(t|t-T_{Min})C^T(t)(C(t)P_{11}(t|t-T_{Min})C^T(t) + R_2)^{-1}C(t))P_{12}(t|t-T_{Min}) \tag{C31}$$

$$P_{22}(t+T_{Min}|t) = P_{22}(t|t-T_{Min}) - P_{12}^T(t|t-T_{Min})C^T(t) \times (C$$
$$(t)P_{11}(t|t-T_{Min})C^T(t) + R_2)^{-1}C(t)P_{12}(t|t-T_{Min}) \tag{C32}$$

$$k_1(t) = AP_{11}(t|t-T_{Min})C^T(t)(C(t)P_{11}(t|t-T_{Min})C^T(t) + R_2)^{-1} \tag{C33}$$

$$k_2(t) = P_{12}^T C^T(t)(C(t)P_{11}(t|t-T_{Min})C^T(t) + R_2)^{-1} \tag{C34}$$

Hence the upper right block reduces to the conventional Kalman predictor as expected.

It remains to define the initial values to these iterations. Starting at t=t' with the Kalman filter estimate, it follows that the initial value of the extended state vector is:

$$x(t'|t'-T_{Min}) = \begin{pmatrix} P_1^{Code}(t'|t'-T_{Min}) \\ M \\ P_n^{Code}(t'|t'-T_{Min}) \\ P^{E+N+Noise}(t'|t'-T_{Min}) \\ P^{E+N+Noise}(t'|t'-T_{Min}) \end{pmatrix}. \tag{C35}$$

Hence it follows that $P_{22}(t'|t'-T_{Min})$ equals the lower right element of $P_{11}(t'|t'-T_{Min})$, while $P_{12}(t'|t'-T_{Min})$ equals the rightmost row of $P_{11}(t'|t'-T_{Min})$.

$$\hat{P}^{E+N+Noise}(t'|t) = \hat{P}^{E+N+Noise}(t'|t-T_{Min}) + k_2(t)(y(t) - \tag{C36}$$
$$C(t)\hat{x}(t'|t-T_{Min}))$$
$$= \hat{P}^{E+N+Noise}(t'|t') + \sum_{s=t'T_{Min}}^{t} k_2(s)(y(s) -$$
$$C(t)\hat{x}(s|s-T_{Min})).$$

Kalman Filter for Only RTWP Measurements

A proposed algorithm for the case where only the total RTWP is measured is a prediction-update filter, where the subscripts distinguish between the prediction and the update steps.

$$K_{Update}(t) = \frac{P^{Cov}_{Prediction}(t - T_{min})}{P^{Cov}_{Prediction}(t - T_{min}) + r_{Measurement}} \quad (C37)$$

$$P^{Total}_{Update}(t) = P^{Total}_{Prediction}(t - T_{min}) + K_{Update}(t) \times (P^{Total}_{Measurement}(t) - P^{Total}_{Prediction}(t)) \quad (C38)$$

$$P^{Cov}_{Update}(t) = P^{Cov}_{Prediction}(t - T_{min}) - \frac{P^{Cov2}_{Prediction}(t - T_{min})}{P^{Cov}_{Prediction}(t - T_{min}) + r_{Measurement}} \quad (C39)$$

$$P^{Total}_{Prediction}(t) = P^{Total}_{Update}(t) \quad (C40)$$

$$P^{Cov}_{Prediction}(t) = P^{Cov}_{Update}(t) + \frac{T_{min}}{T_{Correlation}} r \quad (C41)$$

(C37)-(C41) are repeated increasing t by steps of $T_{Min}$.

Initialization is made at t=0 by:

$$P_{Prediction}^{Total}(0) = P_0^{Total} \quad (C42)$$

$$P_{Prediction}(0) = P_0. \quad (C43)$$

As seen above, the updating gain $K_{Update}(t)$ is as seen above computed from the model parameter $r_{Measurement}$ and from a predicted covariance $P_{Prediction}^{Cov}(t-T_{Min})$ obtained at the previous sampling instance. The total wideband power updated with the latest measurement $P_{Update}^{Total}(t)$ is then computed, using the prediction $P_{Prediction}^{Total}(t)$ and the new measurement $P_{Measurement}^{Total}(t)$. The next step is to compute the updated covariance $P_{Update}^{Cov}(t)$ from the predicted covariance and from $r_{Measurement}$. In the final steps of iteration new values of $P_{Prediction}^{Total}(t)$ and $P_{Prediction}^{Cov}(t)$ are calculated and the time is stepped.

APPENDIX D

Estimation of the conditional probability distribution of $$\min_{t' \in [t-T_{Log}, t]} P^{E+N}(t') + P_N(t')$$

Note: It is very natural to estimate minimum powers. However, the choice to use the minimum value is really ad-hoc. In a general case, an extreme value of a quantity in some way dependent on the estimated $P^{E+N+Noise}$ quantity would be possible to use as a base for the further computations. However, as a simplest embodiment the quantity $$\min_{t' \in [t-T_{Log}, t]} P^{E+N}(t') + P_N(t')$$

is considered here.

Notation, Conditional Probability and Baye's Rule

In the following Bayes rule and the definition of conditional mean, for probability distributions, are used extensively. The following definitions and results can be found e.g. in [2] pages 12-14, or any other text book on estimation.

Probability distributions: Consider two events A and B, with probability distributions $f_A(x)$ and $f_B(y)$, respectively. Then the joint probability distribution of A and B is denoted $f_{A,B}(x,y)$.

Note that the events and the conditioning are expressed by subscripts, whereas the independent variables appear within the parentheses. This notation is used only when probability distributions and cumulative probability distributions are used. When state estimates and covariances, e.g. of the Kalman filter, are referred to, the conditioning may also appear within parentheses.

Conditional probability distributions: The conditional probability distributions $f_{A|B}(x)$ and $f_{B|A}(y)$ are defined by:

$$f_{A,B}(x,y) = f_{A|B}(x) f_B(y) = f_{B|A}(y) f_A(x). \quad (D1)$$

Note that as a consequence of the notation for probability distributions, also the conditioning is expressed as subscripts.

A solution of the above equation now results in the famous Bayes rule:

$$f_{A|B}(x) = \frac{f_{B|A}(y) f_A(x)}{f_B(y)}. \quad (D2)$$

Note that the rules above are best understood by using intersecting circle diagrams. The formal proofs to obtain the results for probability distributions can e.g. use infinitesimal limiting versions of motivations for the probability cases.

Conditional Probability of the Minimum—Model and General Expressions

In this section some general properties of a minimum estimator are derived. Towards that end, the following notation is introduced. The Kalman filter or Kalman smoother estimate of $P^{E+N+Noise}(t')$ is denoted by:

$$\hat{x}_{p^{E+N+Noise}}^{Kalman}(t'|Y^t) \equiv \hat{x}_{p^{E+N+Noise}}^{Kalman}(t'| \{y(s)\}_{s\in[-\infty,t]}) = \hat{x}_{p^{E+N+Noise}}^{Kalman}(t'| \{y(s)\}_{s\in[t-T_{Lag},t]}) \\ \hat{x}_{p^{E+N+Noise}}^{Kalman}(t-T_{Lag}|Y^{t-T_{Lag}})). \quad (D3)$$

Here t' denotes some time within $\lfloor t-T_{Lag}, t \rfloor$. In case t'=t, the Kalman filter of appendix C is used. The conditional distributions are, under mild conditions, all Gaussian sufficient statistics, i.e. only second order properties are needed in order to describe the conditional probability distributions. This is reflected in the conditioning in the last expression of (D3). The conditional distributions follow as:

$$f_{\hat{x}_{p^{E+N+Noise}}^{Kalman}(t')|Y^t}(x) \in N\left(\hat{x}_{p^{E+N+Noise}}^{Kalman}(t'|t), (\sigma_{p^{E+N+Noise}}^{Kalman}(t'|t))^2\right), \quad (D4)$$

where $^{Kalman}$ indicates that the estimate is computed with the Kalman filter or, if t'<t, the Kalman smoother. The quantities $\hat{x}_{p^{E+N+Noise}}^{Kalman}(t'|t)$ and $(\sigma_{p^{E+N+Noise}}^{Kalman}(t'|t))^2$ denote the power estimate and the corresponding covariance, respectively, i.e. the inputs to the estimator. Note that (D4) assumes that the corresponding estimate at time $t-T_{Lag}$ is used as initial value for the Kalman filter.

Then the conditional distribution for the minimum value of the power estimate can be further developed. Towards that end the following model is assumed for the relation between $x_{p^{E+N+Noise}}^0(t') = P^{0,E+N+Noise}(t') \equiv P^{E+N}(t') + P_N(t')$ that represents the true power and $\hat{x}_{p^{E+N+Noise}}^{Kalman}(t'|t) = \hat{P}^{E+N+Noise}(t'|t)$ that represents the estimate:

$$\hat{x}_{p^{E+N+Noise}}^0(t') = \hat{x}_{p^{E+N+Noise}}^{Kalman}(t'|t) + \Delta x_{p^{E+N+Noise}}(t'|t) \quad (D5)$$

$$\hat{x}_{p^{E+N+Noise}}^0(t') \in N(\hat{x}_{p^{E+N+Noise}}^{Kalman}(t'|t), \\ (\sigma_{p^{E+N+Noise}}^{Kalman}(t'|t))^2). \quad (D6)$$

This is in line with the above discussion on sufficient statistics. The notation for the distribution of $\Delta x_{P^{E+N+Noise}}(t'|t)$ is henceforward simplified to:

$$f_{\Delta x}(x) \tag{D7}$$

Note that this distribution does not have to be assumed to be Gaussian (although this is mostly the assumption made).

The conditional probability distribution of the minimum value of $x_{P^{E+N+Noise}}{}^0(t')=P^{0,E+N+Noise}(t')$, $t' \in \lfloor t-T_{Lag}, t \rfloor$ is then to be estimated using data $y(t)$, obtained from the time interval $[-\infty, t]$. At this point it is suitable to refer to FIG. 9, which shows the time intervals that are used in the development of the estimation algorithms that follow below.

Figure 9:
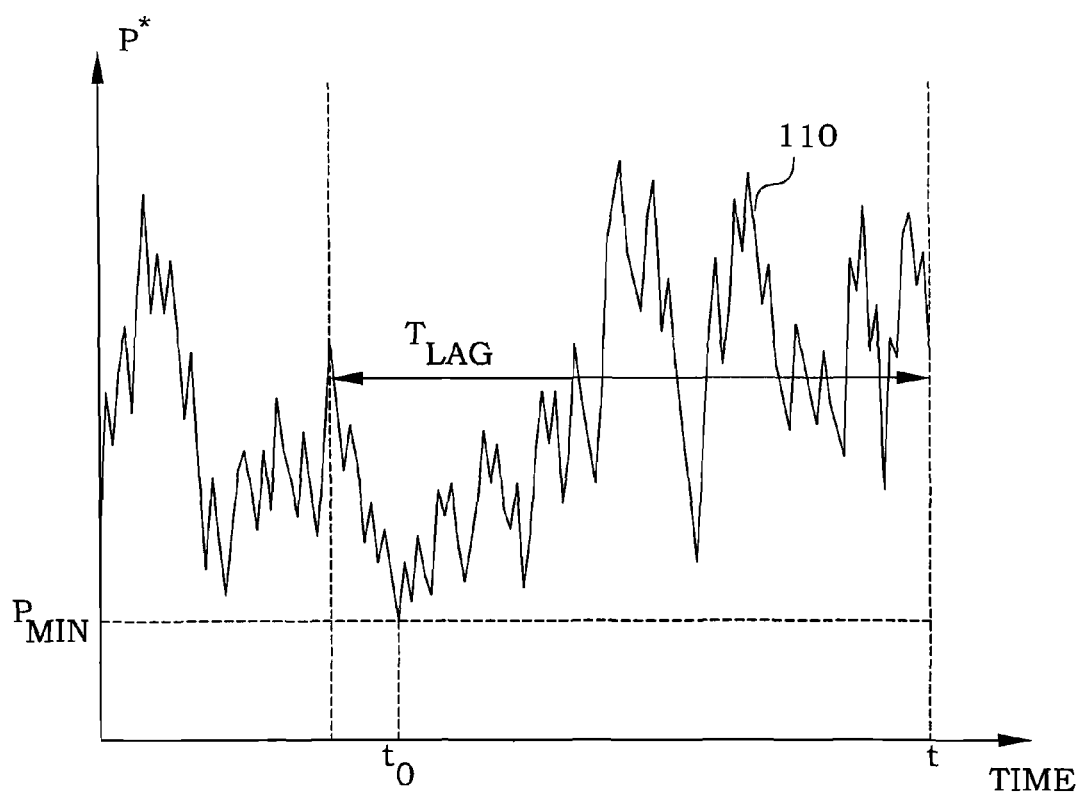
FIG. 9 is a diagram illustrating a typical time variation of a power quantity derived from total received power measurements.

FIG. 9 illustrates a diagram showing time variations 110 of a power-related quantity P*. In a typical case, the power-related quantity is a representation of $P^{E+N+Noise}(t)$. During some time intervals, the power-related quantity P* presents high values. However, at some occasions, the power-related quantity becomes small, indicating that many of the usual contributions to the measured power are absent.

As will be seen below, smoother estimates are theoretically required as inputs to the conditional probability estimation algorithm for the minimum power that operates over the time interval $\lfloor t-T_{Lag}, t \rfloor$. To formally retain optimality in the development, the smoother estimates should also be calculated using all data in $\lfloor t-T_{Lag}, t \rfloor$. However, in a practical implementation, these smoother estimates are typically computed using only a short snapshot of data around the selected smoothing time instance. Several such smoothing estimates, from $\lfloor t-T_{Lag}, t \rfloor$, are then combined to estimate the conditional probability distribution. In the coming discussion the interval $\lfloor t-T_{Lag}, t \rfloor$ is retained in all quantities though, so as not to complicate the development too much. A further simplification can be obtained by replacement of the smoother estimate with a Kalman filter estimate. Simulations indicate that this can be done with very little loss of performance.

The conditional distribution of the minimum value can now be written as follows (cf. (D5)):

$$f_{\min\{x^0_{pE+N+Noise}(t')\}_{t' \in [t-T_{Lag},t]} | Y^t, \min x^0_{pE+N+Noise}(t-T_{Lag})}(x), \tag{D8}$$

where the last quantity of (D8) denotes the initial information of the minimum value. In the following Bayes rule and the definition of conditional mean, for probability distributions, are used extensively.

Then apply Bayes rule and the definition of conditional probability to (D8) using the definitions:

A: $=\min\{x_{P^{E+N+Noise}}{}^0(t')\}_{t' \in [t-T_{Lag}, t]}$
B: $=\min x_{P^{E+N}}{}^0(t-T_{Lag})$
C: $=Y^t$ The following chain of equalities then holds, using Bayes rule, the definition of conditional probability distributions, and the result $f_{B,C|A}(x,y) = f_{(B|A),(C|A)}(x,y)$ (the latter result is easily checked by the drawing of a three-circle diagram):

$$f_{A|B,C}(x) = \frac{f_{B,C|A}(x,y)f_A(x)}{f_{B,C}(x,y)} \tag{D9}$$

$$= \frac{f_{(B|A),(C|A)}(x,y)f_A(x)}{f_{B,C}(x,y)}$$

$$= \frac{f_{(B|A)}(C|A)(x)f_{C|A}(y)f_A(x)}{f_{B,C}(x,y)}$$

-continued $$= \frac{f_{B|A,C}(x)f_{C|A}(y)f_A(x)}{f_{B,C}(x,y)}$$

$$= \frac{f_{B|A,C}(x)f_{A|C}(x)f_C(y)}{f_{B,C}(x,y)}.$$

The last step can again be easily verified by drawing circle diagrams. Now, according to the definitions above, the first factor of the numerator of (D9) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{\min\{x^0_{pE+N+Noise}(t')\}_{t' \in [t-T_{Lag},t]} | Y^t, \min x^0_{pE+N+Noise}(t-T_{Lag})}(x) = \tag{D10}$$

$$\frac{1}{c} f_{\min\{x^0_{pE+N+Noise}(t')\}_{t' \in [t-T_{Lag},t]} | Y^t}(x) f_{\min x^0_{pE+N+Noise}(t-T_{Lag})}(x).$$

One consequence of (D10) that needs to be kept in mind is that a smoothing problem is at hand. The Kalman filtering based pre-processing step treated above hence formally needs to include a Kalman smoother step. In practice, the Kalman filter is normally sufficient though.

Final Expansion of the Conditional Mean of the Minimum Power

The starting point of this subsection is equation (D10) that states that the conditional pdf (probability distribution function) is given as the product of a prior (initial value) and a measurement dependant factor. The prior is supplied by the user and should reflect the prior uncertainty regarding $P_N$. Note that whenever the sliding window is moved and a new estimate is calculated, the same prior is again applied. The prior is hence not updated in the basic setting of the estimator.

To state the complete conditional pdf some further treatment of the first factor of (D10) is needed. The error distribution $f_{\Delta P}(x)$ of (D7), together with the definitions (D5) and (D6) will be central towards this end. Further, in the calculations below, F( ) denotes a cumulative distribution, i.e. the integral of f. Pr(.) denotes the probability of an event.

The following equalities now hold for the first factor of (D10):

$$F_{\min\{x^0_{pE+N+Noise}(t')\}_{t' \in [t-T_{Lag},t]} | Y^t}(x) = \tag{D11}$$

$$Pr\left(\min\{x^0_{pE+N+Noise}(t')\}_{t' \in [t-T_{Lag},t]} \leq x \mid Y^t\right) =$$

$$1 - Pr\left(\min\{x^0_{pE+N+Noise}(t')\}_{t' \in [t-T_{Lag},t]} > x \mid Y^t\right) =$$

$$1 = Pr\left(\forall\, t',\, \Delta x_{pE+N+Noise}(t' \mid t) > x - \hat{x}^{Kalman}_{pE+N+Noise}(t' \mid t)\right) =$$

$$1 - \prod_{t' \in [t-T_{Lag},t]} Pr$$

$$\left(\Delta x_{pE+N+Noise}(t' \mid t) > x - \hat{x}^{Kalman}_{pE+N+Noise}(t' \mid t)\right) =$$

$$1 - \prod_{t' \in [t-T_{Lag},t]} \left(1 - Pr(\Delta x_{pE+N+Noise}(t' \mid t) \leq\right.$$

$$\left. x - \hat{x}^{Kalman}_{pE+N+Noise}(t' \mid t)\right) =$$

-continued $$1 - \prod_{t' \in [t-T_{Lag}, t]} \left(1 - F_{\Delta x(t'|t)}(x - \hat{x}^{Kalman}_{pE+N+Noise}(t'|t))\right).$$

The fourth equality of (D11) follows from the assumption that the Kalman smoother provides a sufficient statistics, i.e. (D5) and (D6). The last equality follows from (D7). Obviously, the most natural assumption is to use a Gaussian distribution for $F_{\Delta P(s)}$. However, (D11) actually allows other distributions as well.

The final step in the derivation of the first factor of the distribution function is to differentiate (D11), obtaining:

$$f_{\min\{x^0_{pE+N+Noise}(t')\}_{t' \in [t-T_{Lag}, t]}|y^t}(x) = \qquad (D12)$$

$$\frac{dF_{\min\{x^0_{pE+N+Noise}(t')\}_{t' \in [t-T_{Lag}, t]}|y^t}(x)}{dx} =$$

$$\sum_{t' \in [t-T_{Lag}, t]} f_{\Delta x(t'|t)}(x - \hat{x}^{Kalman}_{pE+N+Noise}(t'|t))$$

$$\prod_{\substack{q \in [t-T_{Lag}, t] \\ q \neq t'}} \left(1 - F_{\Delta x(t'|t)}(x - \hat{x}^{Kalman}_{pE+N+Noise}(t'|q))\right)$$

Combining with (D10), gives the end result:

$$f_{\min\{x^0_{pE+N+Noise}(t')\}_{t' \in [t-T_{Lag}, t]}|y^t, \min x^0_{pE+N+Noise}(t-T_{Lag})}(x) = \qquad (D13)$$

$$\frac{1}{c}\left(\sum_{t' \in [t-T_{Lag}, t]} f_{\Delta x(t'|t)}(x - \hat{x}^{Kalman}_{pE+N+Noise}(t'|t))\right.$$

$$\prod_{\substack{q \in [t-T_{Lag}, t] \\ q \neq t'}} \left(1 - F_{\Delta x(t'|t)}(x - \hat{x}^{Kalman}_{pE+N+Noise}(t'|q))\right)\right)$$

$$f_{\min x^0_{pE+N+Noise}(t-T_{Lag})}(x)$$

This result constitutes the output 64 referred to in connection with FIG. 5. The expression may look complex. It is fortunately straightforward to evaluate since it is a one dimensional function of Gaussian and cumulative Gaussian distributions given by:

$$f_{\Delta x(t'|t)}(x - \hat{x}^{Kalman}_{pE+N+Noise}(t'|t)) = \qquad (D14)$$

$$\frac{1}{\sqrt{2\pi} \, \sigma^{Kalman}_{pE+N+Noise}(t'|t)} e^{-\frac{(x - \hat{x}^{Kalman}_{pE+N+Noise}(t'|t))^2}{2(\sigma^{Kalman}_{pE+N+Noise}(t'|t))^2}}$$

$$F_{\Delta x(t'|t)}(x - \hat{x}^{Kalman}_{pE+N+Noise}(t'|t)) = \int_{-\infty}^{x - \hat{x}^{Kalman}_{pE+N+Noise}(t'|t)} f_{\Delta x(t'|t)}(y) dy = \qquad (D15)$$

$$\frac{1}{2} \text{erfc}\left(-\frac{(x - \hat{x}^{Kalman}_{pE+N+Noise}(t'|t))}{\sqrt{2} \, \sigma^{Kalman}_{pE+N+Noise}(t'|t)}\right).$$

The quantities $\hat{x}^{Kalman}_{pE+N+Noise}(t'|t)$ and $\sigma^{Kalman}_{pE+N+Noise}(t'|t)$ are readily available as outputs from the Kalman smoother, or the simpler Kalman filter.

APPENDIX E

Estimation of the Conditional Probability Distribution of the Noise Rise

The true noise rise is given by:

$$N_R(t) = \frac{P^{0,Total}(t)}{P^0_N(t)}. \qquad (E1)$$

Since the above quantities need to be replaced by stochastic variables described by the conditional probability distributions derived in the previous parts of this invention disclosure. The inputs are constituted by the quantities 63A, 63B and 64 referred to in connection with FIG. 5, or by the expressions (C18), (C19) and (D13).

Note that the denominator distribution can be expected to vary slowly, hence its update rate can also be significantly slower than that of the numerator distribution. The update rate of the numerator distribution needs to be fast, in order to track fast power variations due e.g. to bursty high rate data traffic in the cell.

To state the model an assumption similar to (D5) and (D6) is made for the total power, i.e.:

$$P^{0,Total}(t) = \hat{P}^{Total}(t|t) + \Delta P^{Total}(t) \qquad (E2)$$

$$P^{0,Total}(t) \in N(\hat{P}^{Total}(t|t), (\sigma_{P^{Total}}^{Kalman}(t|t))^2) \qquad (E3)$$

The second input to the derivation of the conditional probability distribution for the noise rise is the conditional distribution of the minimum power, i.e.: (D13).

The last input to the derivation of the conditional probability distribution of the noise rise is the prior:

$$f_{N_r^0}(z) \qquad (E4)$$

The next step proceeds as in the derivation of (D9) and (D10). The following definitions are introduced:
A:=$N_r(t)$, independent variable z.
B:=$N_r^0$, independent variable z.
B:=$P^{0,Total}(t)$, independent variable x.
C:=$\min\{x_{pE+N+Noise}^0(t')\}_{t' \in [t-T_{Lag}, t]}$, independent variable y.
From these definitions it follows that (cf. the derivation of (D9)):

$$f_{A|B,C,D}(z) = \frac{f_{B,C,D|A}(z, x, y) f_A(z)}{f_{B,C,D}(z, x, y)} \qquad (E5)$$

$$= \frac{f_{(B|A),(C,D|A)}(z, x, y) f_A(z)}{f_{B,C,D}(x, y, z)}$$

$$= \frac{f_{(B|A)}(C,D|A)(z) f_{C,D|A}(x, y) f_A(z)}{f_{B,C,D}(x, y, z)}$$

$$= \frac{f_{B|C,D,A}(z) f_{C,D|A}(x, y) f_A(z)}{f_{B,C,D}(x, y, z)}$$

$$= \frac{f_{B|C,D,A}(z) f_{A|C,D}(z) f_{C,D}(x, y)}{f_{B,C,D}(x, y, z)}.$$

Now, according to the definitions above, the first factor of the numerator of (E5) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{N_r(t)|N_r^0, P^{0,Total}(t), \min\{x^0_{pE+N+N}(t')\}_{t' \in [t-T_{Lag}, t]}}(z) = \tag{E6}$$

$$\frac{1}{c_{N_r}} f_{N_r(t)|P^{0,Total}(t), \min\{x^0_{pE+N+N}(t')\}_{t' \in [t-T_{Lag}, t]}}(z) f_{N_r}(z)$$

Since the conditional distribution of $P^{0,Total}(t)$ can be easily calculated from (C14) and (C15), and since the conditional distribution of $\min(x_{pE+N+Noise}^0(t'))_{t' \in [t-T_{Lag}, t]}$ is available in (D13), it is straightforward to compute the conditional distribution of the first factor of (E6) as the quotient of the corresponding two stochastic variables.

To show how this is done the probability distribution of a quotient is first derived. The probability distribution of the quotient Z of two independent stochastic variables X and Y follows from:

$$F_Z(z) = Pr(Z \le z) = \tag{E7}$$

$$Pr(X/Y \le z) = Pr(X \le Yz) = \int_{-\infty}^{\infty} \int_{-\infty}^{yz} f_{X,Y}(x,y) \, dx \, dy =$$

$$\int_{-\infty}^{\infty} \left( \int_{-\infty}^{yz} f_X(x) dx \right) f_Y(y) dy \Rightarrow f_Z(z) = \frac{dF_Z(z)}{dz} =$$

$$\int_{-\infty}^{\infty} \left( \frac{d}{dz} \int_{-\infty}^{yz} f_X(x) dx \right) f_Y(y) dy = \int_{-\infty}^{\infty} y f_X(yz) f_Y(y) dy.$$

Here $P^{0,Total}(t)$ and $$\min_{t' \in [t-T_{Lag}, t]} P^{0,E+N}(t') + P_N^0(t')$$

corresponds to X and Y, respectively. Alternatively, in case the total power estimate is used for assessment of the conditional distribution of the minimum value, $P^{0,Total}(t)$ and $$\min_{t' \in [t-T_{Lag}, t]} P^{0,Total}(t)$$

correspond to X and Y, respectively.

Hence, by discretization of the variables y and z, it follows that:

$$f_{N_r(t)|N_r^0, P^{=,Total}(t), \min\{x^0_{pE+N+N}(t')\}_{t' \in [t-T_{Lag}, t]}}(z_i) \approx \tag{E8}$$

$$\frac{1}{c_{N_r}} \sum_{j=1}^{N} y_j \frac{1}{\sqrt{2\pi} \, \sigma_{pTotal}^{Kalman}(t|t)} e^{-\frac{1}{2}\frac{(y_j z_i - x_{pTotal}^{Kalman}(t|t))^2}{(\sigma_{pTotal}^{Kalman}(t|t))^2}} \times \frac{1}{c\sqrt{2\pi}}$$

$$\sum_{t' \in [t-T_{Lag}, t]} \frac{1}{\sigma_{pE+N+Noise}^{Kalman}(t'|t)} \left( y_j e^{-\frac{(y_j - x_{pE+N+Noise}^{Kalman}(t'|t))^2}{2(\sigma_{pE+N+Noise}^{Kalman}(t'|t))^2}} \times \right.$$

$$\prod_{\substack{q \in [t-T_{Lag}, t] \\ q \ne t'}} \left( 1 - \frac{1}{2} \operatorname{erfc}\left( -\frac{y_j - \hat{x}_{pE+N+Noise}^{Kalman}(q|t)}{\sqrt{2} \, \sigma_{pE+N+Noise}^{Kalman}(q|t)} \right) \right)$$

$$\left. f_{\min x_{pE+N+Noise}^0(t')}(y_j) \right) \Delta y f_{N_r^0}(z_i),$$

$i = 1, \ldots, N.$

Note that the discretization is necessary to evaluate the integrals in the expressions that cannot be solved analytically. The discretization means that the exact conditional probability distributions are approximated by histograms.

APPENDIX F

Estimation of the Noise Rise and the Corresponding Standard Deviation

Referring to [2], pages 123-126, the optimal noise rise estimate is given by the mean of the conditional probability distribution of the noise rise (E8). It is hence straightforward to obtain the estimate and variance:

$$\hat{N}_R(t|Y^t) = \int_{-\infty}^{\infty} z f_Z(z) dz = \int_{-\infty}^{\infty} z \int_{-\infty}^{\infty} y f_X(yz) f_Y(y) dy \, dz \approx \tag{F1}$$

$$\sum_{i=1}^{M} z_i \sum_{j=1}^{N} y_j \frac{1}{\sqrt{2\pi} \, \sigma_{pTotal}^{Kalman}(t|t)} e^{-\frac{1}{2}\frac{(y_j z_i - x_{pTotal}^{Kalman}(t|t))^2}{(\sigma_{pTotal}^{Kalman}(t|t))^2}} \times$$

$$\frac{1}{c\sqrt{2\pi}} \sum_{t' \in [t-T_{Lag}, t]} \frac{1}{\sigma_{pE+N+Noise}^{Kalman}(t'|t)}$$

$$\left( y_j e^{-\frac{(y_j - \hat{x}_{pE+N+Noise}^{Kalman}(t'|t))^2}{2(\sigma_{pE+N+Noise}^{Kalman}(t'|t))^2}} \times \right.$$

$$\prod_{\substack{q \in [t-T_{Lag}, t] \\ q \ne t'}} \left( 1 - \frac{1}{2} \operatorname{erfc}\left( -\frac{y_j - \hat{x}_{pE+N+Noise}^{Kalman}(q|t)}{\sqrt{2} \, \sigma_{pE+N+Noise}^{Kalman}(q|t)} \right) \right)$$

$$\left. f_{\min x_{pE+N+Noise}^0(t')}(y_j) \right) \Delta y \Delta z$$

-continued $$\hat{\sigma}_{N_R}^2(t \mid Y^t) \approx \sum_{i=1}^{M} \left(z_i - \hat{N}_R(t \mid Y^t)\right)^2 \quad (F2)$$

$$\sum_{j=1}^{N} y_j \frac{1}{\sqrt{2\pi}\, \sigma_{pTotal}^{Kalman}(t \mid t)} e^{-\frac{1}{2}\frac{\left(y_j z_i - x_{pTotal}^{Kalman}(t \mid t)\right)^2}{\left(\sigma_{pTotal}^{Kalman}(t \mid t)\right)^2}} \times \frac{1}{c\sqrt{2\pi}}$$

$$\sum_{t' \in [t-T_{Lag}, t]} \frac{1}{\delta_{pE+N+Noise}^{Kalman}(t' \mid t)} \left( y_j e^{-\frac{\left(y_j - \hat{x}_{pE+N+Noise}^{Kalman}(t' \mid t)\right)^2}{2\left(\sigma_{pE+N+Noise}^{Kalman}(t' \mid t)\right)^2}} \times \right.$$

$$\prod_{\substack{q \in [t-T_{Lag}, t] \\ q \neq t'}} \left(1 - \frac{1}{2}\mathrm{erfc}\left(-\frac{y_j - \hat{x}_{pE+N+Noise}^{Kalman}(q \mid t)}{\sqrt{2}\,\sigma_{pE+N+Noise}^{Kalman}(q \mid t)}\right)\right)$$

$$\left. f_{min x_{pE+N+Noise}^0(t')}(y_j) \right) \Delta y \Delta z.$$

Note that (F1) and (F2) are valid also for the case where the conditional distributions of the minimum value of the total power are used instead. The modification is trivial.

(F1) and (F2) is the end result of the estimate. It should be noted that these two quantities are obtained without any intermediate estimation of any noise floor. Note also that the estimator is optimal and soft.

REFERENCES

[1] H. Holma and A. Toskala, WCDMA for UMTS—Radio Access for Third Generation Mobile Communications. Chichester, UK: Wiley, 2000, page 111.
[2] T. Söderström, Discrete Time Stochastic Systems. London, UK: Springer, 2002, pp. 12-14, 123-126, 142, 149-150, 247.

The invention claimed is:

1. A method for load estimation of a cell in a wireless communications system, the method comprising the steps of:
   measuring a received total wideband power;
   estimating a probability distribution for a first power quantity from at least said measured received total wideband power;
   computing a conditional probability distribution of a noise floor measure based on at least said measured received total wideband power;
   providing a conditional probability distribution for a noise rise measure, based at least on said probability distribution for said first power quantity and said conditional probability distribution of said noise floor measure; and
   estimating the load in the cell based on a calculated value of said noise rise measure, which in turn is based on said conditional probability distribution for said noise rise measure.

2. The method according to claim 1, comprising the further step of calculating a standard deviation of said noise rise measure value based on said conditional probability distribution for said noise rise measure.

3. The method according to claim 1, wherein said estimated load is used to perform admission control in the cell.

4. A node of a wireless communications system adapted to perform load estimation, the node comprising:
   a measuring device adapted to obtaining measures of received total wideband power;
   an estimator adapted to estimate a probability distribution for a first power quantity from said measured received total wideband power;
   a computational device adapted to compute a conditional probability distribution of a noise floor measure based on at least said measured received total wideband power;
   a computational device adapted to provide a conditional probability distribution for a noise rise measure, based at least on said probability distribution for said first power quantity and said conditional probability distribution of said noise floor measure; and
   an estimator adapted to estimating the load in the cell based on a calculated value of said noise rise measure, which in turn is based on said conditional probability distribution for said noise rise measure.

5. The node according to claim 4, wherein said measuring device is adapted to measure received total wideband power.

6. The node according to claim 4, wherein said node is adapted to perform admission control in the cell using said estimated load.

* * * * *

UNITED STATES PATENT AND TRADEMARK OFFICE
CERTIFICATE OF CORRECTION

PATENT NO. : 8,145,137 B2
APPLICATION NO. : 13/158959
DATED : March 27, 2012
INVENTOR(S) : Karl T. Wigren It is certified that error appears in the above-identified patent and that said Letters Patent is hereby corrected as shown below:

In Column 16, Line 35, in Equation (A5), delete "$\sum_{i=1}^{n}$" and insert -- $\sum_{i=1}^{N}$ --, therefor.

In Column 19, Lines 25-26, in Equation (C6), delete "$\frac{1}{1+\eta_1(t)}$" and insert -- $\frac{1}{1+\eta_x(t)}$ --, therefor.

In Column 25, Line 5, in Equation (D7), delete "$f_{Ax}(x)$" and insert -- $f_{Ax}(x)$. --, therefor.

In Column 28, Line 40, in Equation (E4), delete "$f_{N_r}0(z)$" and insert -- $f_{N_r^0}(z)$. --, therefor.

Signed and Sealed this
Fourteenth Day of August, 2012

David J. Kappos
*Director of the United States Patent and Trademark Office*